United States Patent
Stevens et al.

(10) Patent No.: US 10,540,615 B2
(45) Date of Patent: Jan. 21, 2020

(54) NETWORK PLANNING TOOL

(75) Inventors: Marc Daniel Stevens, Louisville, KY (US); Allan Brady Cole, Louisville, KY (US)

(73) Assignee: UNITED PARCEL SERVICE OF AMERICA, INC., Atlanta, GA (US)

(*) Notice: Subject to any disclaimer, the term of this patent is extended or adjusted under 35 U.S.C. 154(b) by 857 days.

(21) Appl. No.: 13/606,775

(22) Filed: Sep. 7, 2012

(65) Prior Publication Data

US 2013/0066610 A1 Mar. 14, 2013

Related U.S. Application Data

(60) Provisional application No. 61/534,094, filed on Sep. 13, 2011.

(51) Int. Cl.
*G06G 7/48* (2006.01)
*G06Q 10/04* (2012.01)

(52) U.S. Cl.
CPC .................... *G06Q 10/04* (2013.01)

(58) Field of Classification Search
CPC ..... G06F 17/5009; G06F 17/50; G06Q 10/08; G06Q 10/00; G06Q 30/00; G06Q 10/04
USPC .............................. 703/6; 705/338
See application file for complete search history.

(56) References Cited

U.S. PATENT DOCUMENTS

| | | | |
|---|---|---|---|
| 6,198,920 B1* | 3/2001 | Doviak et al. | 455/426.1 |
| 6,795,823 B1* | 9/2004 | Aklepi et al. | 709/238 |
| 2002/0138352 A1* | 9/2002 | DeMaggio | 705/22 |
| 2006/0176817 A1* | 8/2006 | Liu et al. | 370/235 |
| 2006/0178806 A1* | 8/2006 | Liu et al. | 701/117 |
| 2006/0241990 A1* | 10/2006 | Sun et al. | 705/8 |
| 2008/0221960 A1* | 9/2008 | Moorkanat et al. | 705/8 |
| 2008/0243570 A1* | 10/2008 | Moorkanat et al. | 705/7 |
| 2008/0306783 A1* | 12/2008 | Yee et al. | 705/7 |
| 2009/0043486 A1* | 2/2009 | Yang et al. | 701/117 |
| 2009/0187450 A1* | 7/2009 | Kocis | G06Q 10/0831 705/331 |
| 2009/0228313 A1* | 9/2009 | Ding et al. | 705/7 |
| 2010/0070376 A1* | 3/2010 | Proud et al. | 705/21 |
| 2010/0274609 A1* | 10/2010 | Shoemaker et al. | 705/8 |
| 2010/0299177 A1* | 11/2010 | Buczkowski | G06Q 10/06 705/7.13 |

(Continued)

*Primary Examiner* — Hugh M Jones
(74) *Attorney, Agent, or Firm* — Shook, Hardy & Bacon L.L.P.

(57) ABSTRACT

Various embodiments provide a network planning tool comprising one or more memory storage areas containing data related to a plurality of transportation networks, and one or more computer processors configured to: receive input data comprising one or more modifications to one or more parameters associated with the plurality of transportation networks; retrieve at least a portion of the data contained in the one or more memory storage areas; validate the input data against the portion of data retrieved from the one or more memory storage areas, the validating comprising at least calculating one or more impacts to the integrated flow model based at least in part upon the received input data; and calculate, based at least in part upon the identified one or more impacts, one or more updated flow models for the plurality of transportation networks. Associated computer program products and computer-implemented methods are also provided.

20 Claims, 20 Drawing Sheets

(56) References Cited

U.S. PATENT DOCUMENTS

| | | | |
|---|---|---|---|
| 2011/0047000 A1* | 2/2011 | Perry | G06Q 10/04 705/7.29 |
| 2011/0161241 A1* | 6/2011 | Jani et al. | 705/338 |
| 2011/0191011 A1* | 8/2011 | McBride et al. | 701/117 |
| 2011/0231335 A1* | 9/2011 | Kocis | G06Q 10/0831 705/338 |

* cited by examiner

NETWORK PLANNING TOOL

CROSS-REFERENCE TO RELATED APPLICATIONS

This application claims priority to U.S. Provisional Application Ser. No. 61/534,094, filed Sep. 13, 2011, which is hereby incorporated herein in its entirety.

BACKGROUND

Shipping carriers (e.g., common carriers, such as United Parcel Service, Inc. (UPS), FedEx, United States Postal Service (USPS), etc.) daily transport millions of packages over tens of thousands of routes to and from a variety of clients for different purposes. Generally, shipping carriers may reference and use multiple transportation networks tools to simulate various shipment and load flow models based upon various data maintained and stored within each of the tools. For an exemplary carrier tracking more than 60,000 loads a day associated with nearly as many pieces of equipment and personnel, distributed across multiple geographic area regions, accurate and efficient maintenance of flow planning models becomes extremely complex. When changes, revisions, and/or updates occur, near real-time validation and optimization of such against existing flow planning models across the multiple transportation network tools is unfeasible. Thus, a need exists to provide a single tool to provide a simplistic network planning process that facilitates near real-time validation and optimization of changes to various parameters across multiple transportation networks.

BRIEF SUMMARY

According to various embodiments of the present invention, a network planning tool is provided for simulating an integrated flow model for a plurality of transportation networks. Various embodiments of the network planning tool comprise one or more memory storage areas containing data related to a plurality of transportation networks, and one or more computer processors. The computer processors are configured to: (A) receive input data comprising one or more modifications to one or more parameters associated with the plurality of transportation networks; (B) retrieve at least a portion of the data contained in the one or more memory storage areas; (C) validate the input data against the portion of data retrieved from the one or more memory storage areas, the validating comprising at least calculating one or more impacts to the integrated flow model based at least in part upon the received input data; and (D) calculate, based at least in part upon the identified one or more impacts, one or more updated flow models for the plurality of transportation networks.

According to various embodiments of the present invention, a computer program product is provided comprising at least one computer-readable storage medium having computer-readable program code portions embodied therein. The computer-readable program code portions comprise: a first executable portion configured for receiving data associated with a plurality of transportation networks, wherein the data comprises a first portion of existing data and a second portion of newly input data; a second executable portion configured for validating the newly input data against the existing data, wherein the validating comprises calculating one or more impacts to an integrated flow model for the plurality of transportation networks based at least in part upon the newly input data; and a third executable portion configured for using the one or more impacts to the integrated flow model, the input data, and the existing data to calculate one or more updated flow models for the plurality of transportation networks.

According to various embodiments of the present invention, a computer-implemented method is provided for facilitating near real-time validation and optimization of an integrated flow model for a plurality of transportation networks. Various embodiments of the method comprise the steps of: (A) receiving and storing input data within one or more memory storage areas, the input data comprising one or more modifications to one or more parameters associated with the plurality of transportation networks; (B) retrieving from the one or more memory storage areas at least a portion of previously existing data, the previously existing data also being associated with the plurality of transportation networks; (C) validate, via at least one computer processor, the input data against the retrieved portion of existing data, the validating comprising at least calculating, via the at least one computer processor, one or more impacts to the integrated flow model based at least in part upon the received input data; and (D) calculate, via the at least one computer processor, one or more updated flow models for the plurality of transportation networks, the one or more updated flow models being based at least in part upon the identified one or more impacts.

BRIEF DESCRIPTION OF THE SEVERAL VIEWS OF THE DRAWING(S)

The accompanying drawings incorporated herein and forming a part of the disclosure illustrate several aspects of the present invention and together with the detailed description serve to explain certain principles of the present invention. In the drawings, which are not necessarily drawn to scale:

FIG. 11 is an exemplary screen display of a home screen 1100 of the network planning tool according to various embodiments;

Figure 17:
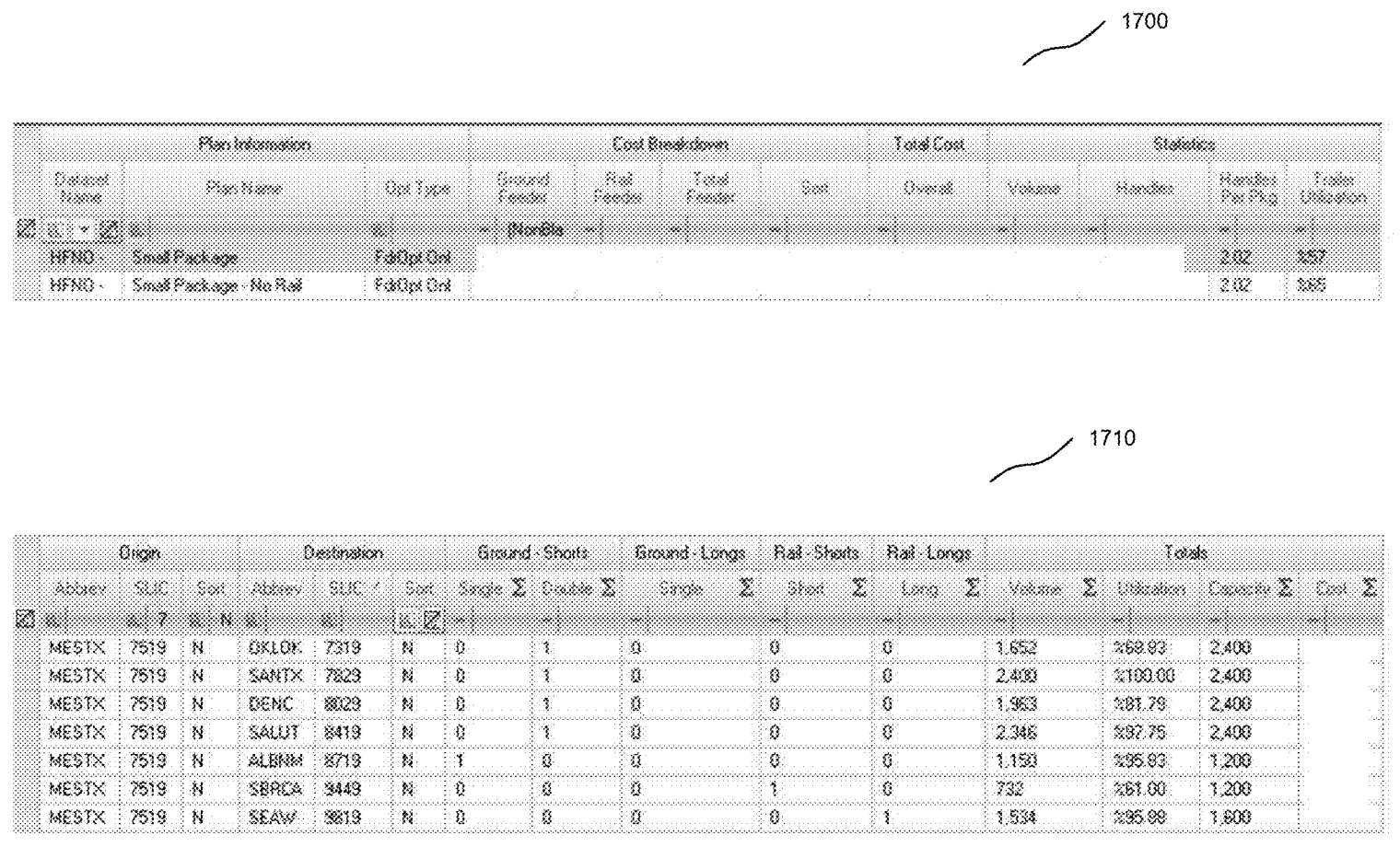

FIG. 17 illustrates exemplary screen displays of a cost summary report screen 1700 and a load summary report screen 1710 of an operator interface of the network planning tool according to various embodiments;

Figure 18:
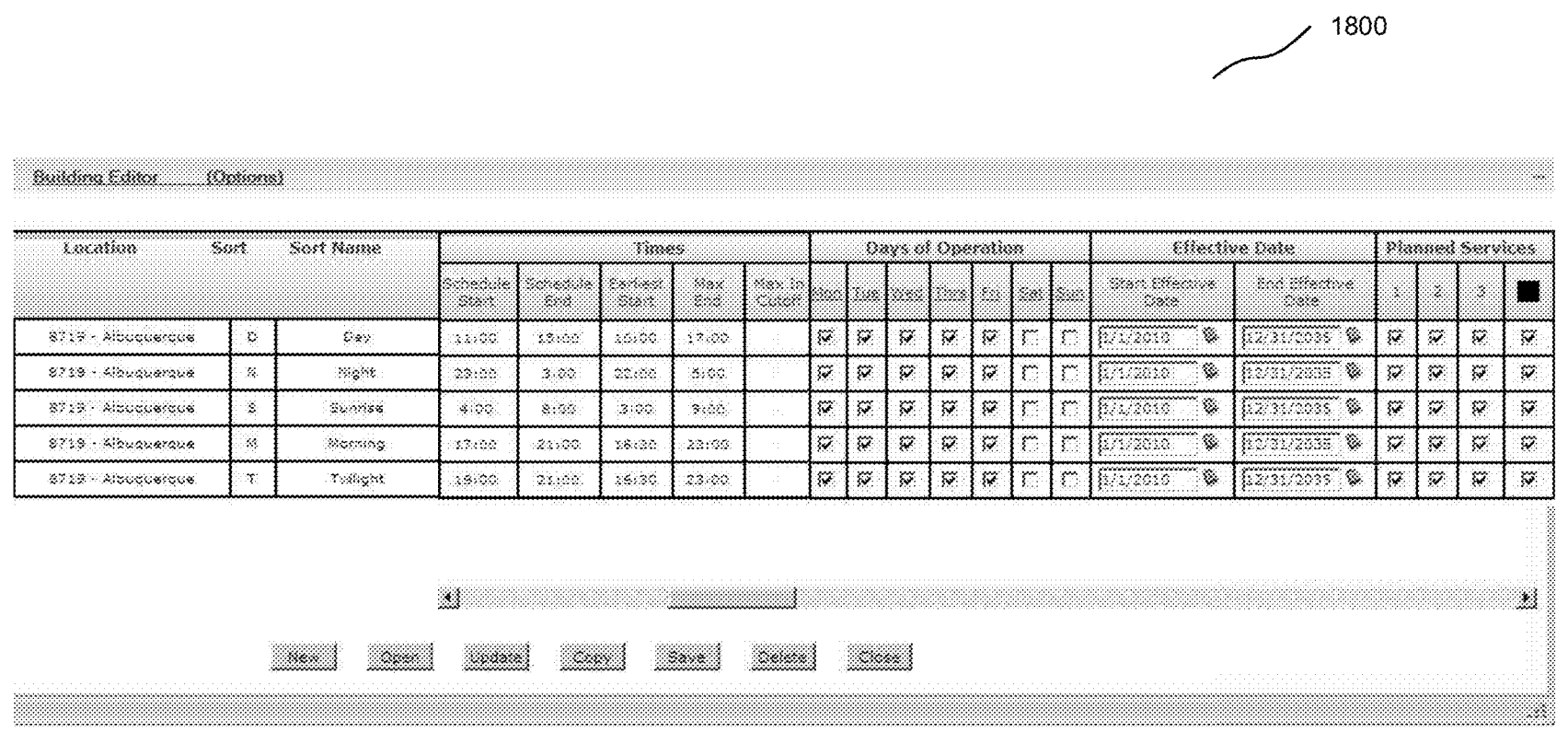

FIG. 18 is an exemplary screen display of a facility summary report screen 1800 of an operator interface of the network planning tool according to various embodiments;

Figure 19:
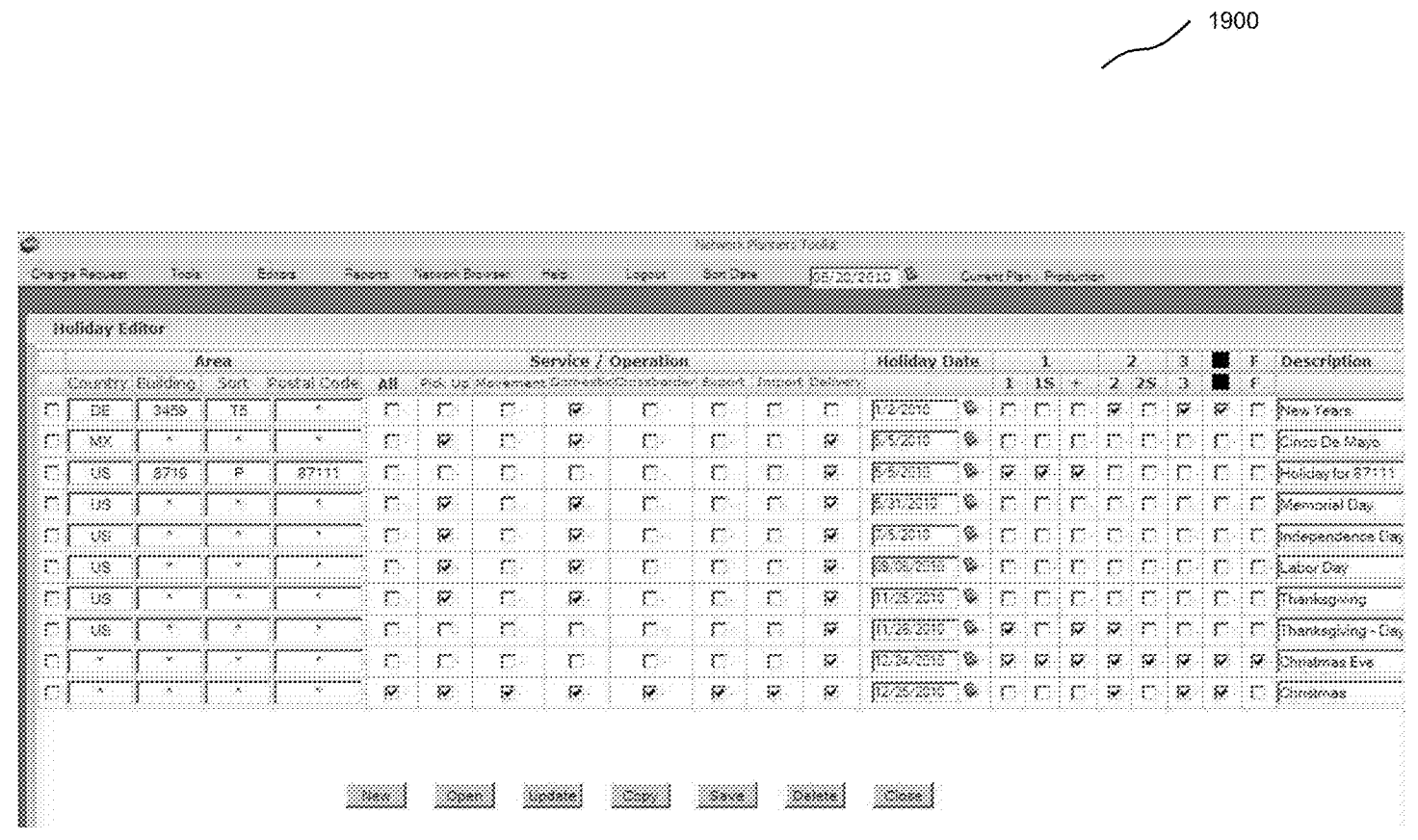

FIG. 19 is an exemplary screen display of an operations summary report screen 1900 of an operator interface of the network planning tool according to various embodiments.

DETAILED DESCRIPTION OF VARIOUS EMBODIMENTS

Figure 1:
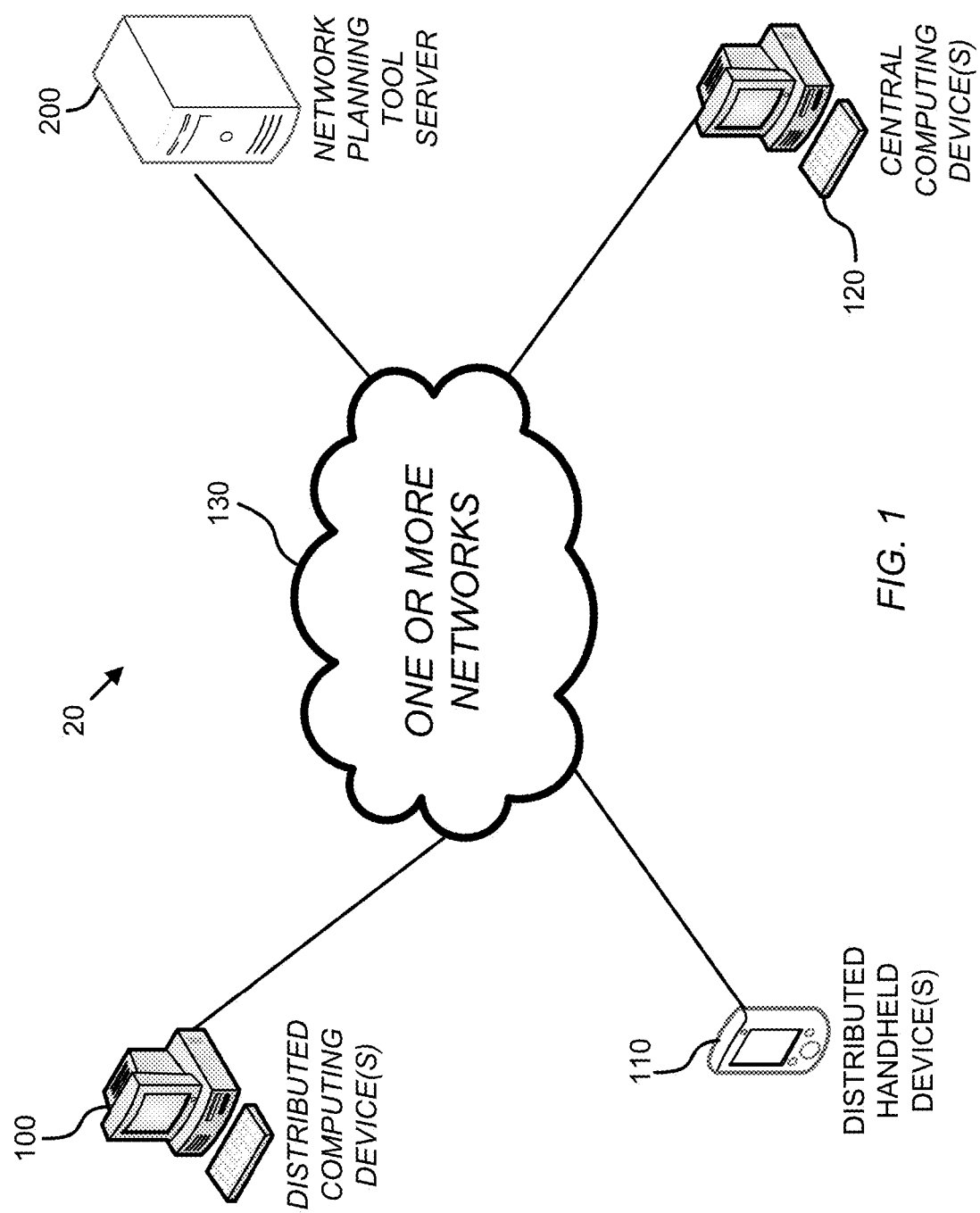
FIG. 1 is a block diagram of a system architecture 20 that may be used in conjunction with a network planning tool according to various embodiments.

Various embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein. Rather, these embodiments are provided so that this disclosure will satisfy applicable legal requirements. Unless otherwise defined, all technical and scientific terms used herein have the same meaning as commonly known and understood by one of ordinary skill in the art to which the invention relates. The term "or" is used herein in both the alternative and conjunctive sense, unless otherwise indicated. Like numbers refer to like elements throughout.

Apparatuses, Methods, Systems, and Computer Program Products

As should be appreciated, various embodiments may be implemented in various ways, including as apparatuses, methods, systems, or computer program products. Accordingly, the embodiments may take the form of an entirely hardware embodiment, or an embodiment in which a processor is programmed to perform certain steps. Furthermore, various implementations may take the form of a computer program product on a computer-readable storage medium having computer-readable program instructions embodied in the storage medium. In such embodiments, any suitable computer-readable storage medium may be utilized including hard disks, CD-ROMs, optical storage devices, or magnetic storage devices.

Various embodiments are described below with reference to block diagrams and flowchart illustrations of apparatuses, methods, systems, and computer program products. It should be understood that each block of any of the block diagrams and flowchart illustrations, respectively, may be implemented in part by computer program instructions, e.g., as logical steps or operations executing on a processor in a computing system. These computer program instructions may be loaded onto a computer, such as a special purpose computer or other programmable data processing apparatus to produce a specifically-configured machine, such that the instructions which execute on the computer or other programmable data processing apparatus implement the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the functionality specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide operations for implementing the functions specified in the flowchart block or blocks.

Accordingly, blocks of the block diagrams and flowchart illustrations support various combinations for performing the specified functions, combinations of operations for performing the specified functions and program instructions for performing the specified functions. It should also be understood that each block of the block diagrams and flowchart illustrations, and combinations of blocks in the block diagrams and flowchart illustrations, could be implemented by special purpose hardware-based computer systems that perform the specified functions or operations, or combinations of special purpose hardware and computer instructions.

Exemplary System Architecture 20

FIG. 1 is a block diagram of a system architecture 20 that can be used in conjunction with various embodiments of the present invention. In at least the illustrated embodiment, the architecture 20 may include one or more distributed computing devices 100, one or more distributed handheld devices 110, and one or more central computing devices 120, each configured in communication with a network planning tool server 200 via one or more networks 130. While FIG. 1 illustrates the various system entities as separate, standalone entities, the various embodiments are not limited to this particular architecture.

According to various embodiments of the present invention, the one or more networks 130 may be capable of supporting communication in accordance with any one or more of a number of second-generation (2G), 2.5G, third-generation (3G), and/or fourth-generation (4G) mobile communication protocols, or the like. More particularly, the one or more networks 130 may be capable of supporting communication in accordance with 2G wireless communication protocols IS-136 (TDMA), GSM, and IS-95 (CDMA). Also, for example, the one or more networks 130 may be capable of supporting communication in accordance with 2.5G wireless communication protocols GPRS, Enhanced Data GSM Environment (EDGE), or the like. In addition, for example, the one or more networks 130 may be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones). As yet another example, each of the components of the system 5 may be configured to communicate with one another in accordance with techniques such as, for example, radio frequency (RF), Bluetooth™, infrared (IrDA), or any of a number of different wired or wireless networking techniques, including a wired or wireless Personal Area Network ("PAN"), Local Area Network ("LAN"), Metropolitan Area Network ("MAN"), Wide Area Network ("WAN"), or the like.

Although the distributed computing device(s) 100, the distributed handheld device(s) 110, the central computing device(s) 120, and the network planning tool server 200 are illustrated in FIG. 1 as communicating with one another over the same one or more networks 130, these devices may likewise communicate over multiple, separate networks. For example, while the central computing devices 120 may communicate with the network planning tool server 200 over a wireless personal area network (WPAN) using, for example, Bluetooth techniques, one or more of the distributed devices 100, 110 may communicate with the network planning tool server 200 over a wireless wide area network (WWAN), for example, in accordance with EDGE, or some other 2.5G wireless communication protocol.

According to one embodiment, in addition to receiving data from the network planning tool server 200, the distributed computing devices 100, the distributed handheld devices 110, and the central computing devices 120 may be further configured to collect and transmit data on their own. Indeed, the distributed computing devices 100, the distributed handheld devices 110, and the central computing devices 120 may be any device associated with a carrier (e.g., a common carrier, such as UPS, FedEx, USPS, etc.). In various embodiments, the distributed computing devices 100, the distributed handheld devices 110, and the central computing devices 120 may be capable of receiving data via one or more input units or devices, such as a keypad, touchpad, barcode scanner, radio frequency identification (RFID) reader, interface card (e.g., modem, etc.) or receiver. The distributed computing devices 100, the distributed handheld devices 110, and the central computing devices 120 may further be capable of storing data to one or more volatile or non-volatile memory modules, and outputting the data via one or more output units or devices, for example, by displaying data to the user operating the device, or by transmitting data, for example over the one or more networks 130. One type of a distributed handheld device 110, which may be used in conjunction with embodiments of the present invention is the Delivery Information Acquisition Device (DIAD) presently utilized by UPS.

Network Planning Tool Server 200

In various embodiments, the network planning tool server 200 includes various systems for performing one or more functions in accordance with various embodiments of the present invention, including those more particularly shown and described herein. It should be understood, however, that the control server 200 might include a variety of alternative devices for performing one or more like functions, without departing from the spirit and scope of the present invention. For example, at least a portion of the server 200, in certain embodiments, may be located on the distributed computing device(s) 100, the distributed handheld device(s) 110, and the central computing device(s) 120, as may be desirable for particular applications.

Figure 2:
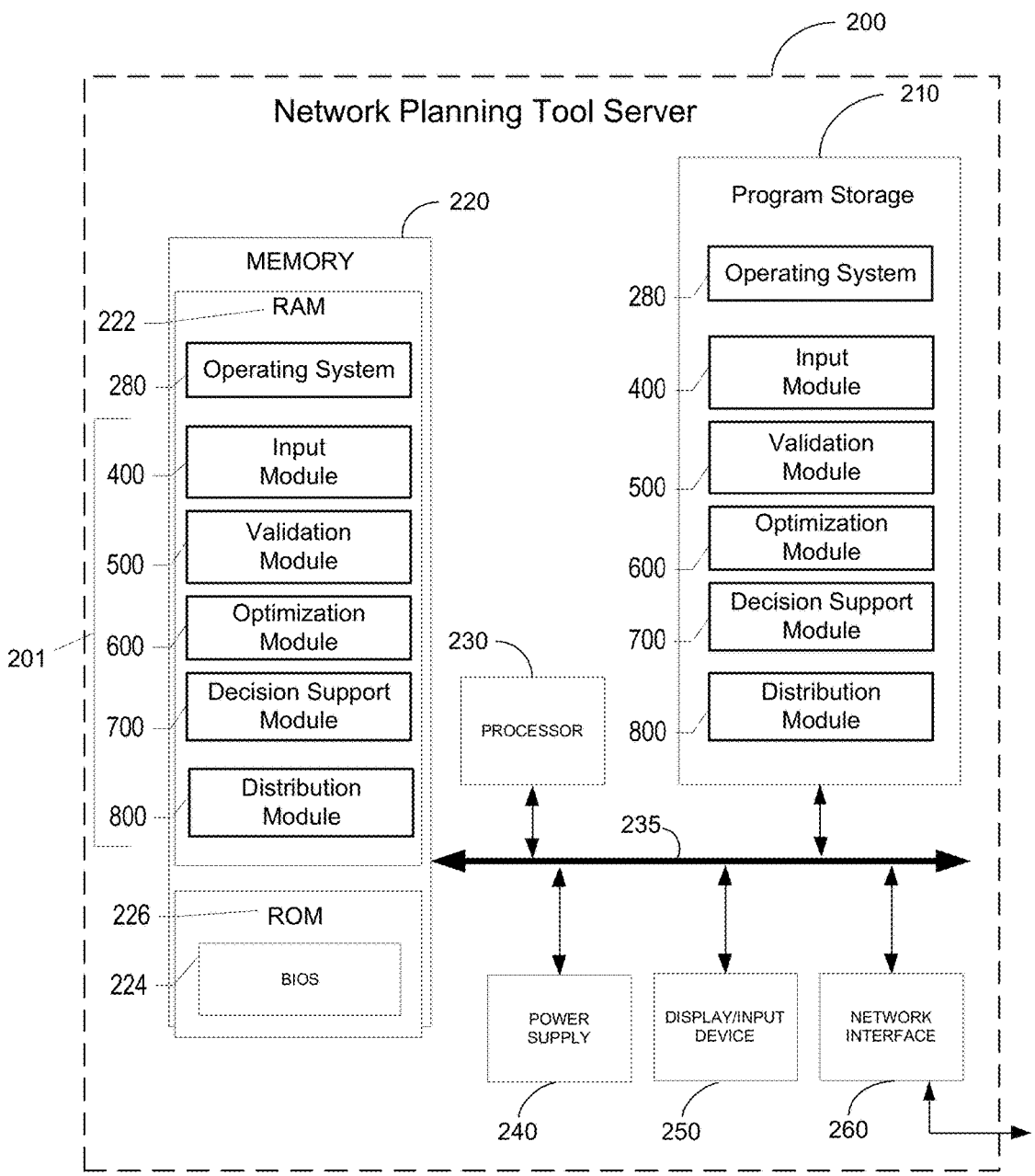
FIG. 2 is schematic block diagram of a network planning tool server 200 containing a network planning tool 201 according to various embodiments.

FIG. 2 is a schematic diagram of the network planning tool server 200 according to various embodiments. The network planning tool server 200 includes a processor 230 that communicates with other elements within the server via a system interface or bus 235. Also included in the network planning tool server 200 is a display/input device 250 for receiving and displaying data. This display/input device 250 may be, for example, a keyboard or pointing device that is used in combination with a monitor. The network planning tool server 200 further includes memory 220, which preferably includes both read only memory (ROM) 226 and random access memory (RAM) 222. The server's ROM 226 is used to store a basic input/output system 224 (BIOS), containing the basic routines that help to transfer information between elements within the network planning tool server 200.

In addition, the network planning tool server 200 includes at least one storage device or program storage 210, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 210 are connected to the system bus 235 by an appropriate interface. The storage devices 210 and their associated computer-readable media provide nonvolatile storage for a personal computer. As will be appreciated by one of ordinary skill in the art, the computer-readable media described above could be replaced by any other type of computer-readable media known in the art. Such media include, for example, magnetic cassettes, flash memory cards, digital video disks, and Bernoulli cartridges.

Although not shown, according to an embodiment, the storage device 210 and/or memory of the network planning tool server 200 may further provide the functions of a data storage device, which may store historical and/or current delivery data and delivery conditions that may be accessed by the network planning tool server 200. In this regard, the storage device 210 may comprise one or more databases. The term "database" refers to a structured collection of records or data that is stored in a computer system, such as via a relational database, hierarchical database, or network database and as such, should not be construed in a limiting fashion.

A number of program modules comprising, for example, one or more computer-readable program code portions executable by the processor 230, may be stored by the various storage devices 210 and within RAM 222. Such program modules include an operating system 280, an input module 400, a validation module 500, an optimization module 600, a decision support module 700, and a distribution module 800. Together, these program modules define a network planning tool 201 according to various embodiments. In these and other embodiments, the input module 400, the validation module 500, the optimization module 600, the decision support module 700, and the distribution module 800 control certain aspects of the operation of the network planning tool 201 and thus the network planning tool server 200 with the assistance of the processor 230 and operating system 280.

In general, as will be described in further detail below, the input module 400 is configured to (i) receive, store, manage, and provide a variety of existing data associated with a shipping network and used to generate a flow model thereof; and (ii) receive, store, and provide a variety of update data likewise associated with the shipping network and used to revise a flow model thereof. The validation module 500 is configured to activate a model validation tool, which calculates whether the input (e.g., updated) data results in any impacts to one or more parameters of the flow model. Any identified impacted model data is presented to a user of the tool and associated system 20. The optimization module 600 is then configured to activate a model optimization tool, which applies one or more algorithms to generate one or more optimized models based upon the existing data, the input data, and the identified impacted data. The optimization module 600 may then either display the one or more optimized models for user selection or automatically select a single optimized model based upon predetermined user parameters or otherwise. Once the single optimized model is selected, it is transmitted to the distribution module 800, which activates a distribution tool 810 to notify all networked devices (e.g., devices 100, 110, 120, as previously described herein) of the updated optimization.

Where global optimization is not necessary and merely a single limited modification is required, the input module 400 may alternatively transmit the update data and a limited data set to the decision support module 700, which is configured generally to provide updated model data based for the limited change (e.g., bypassing a particular facility). Much like the optimization module 600, the decision support module 700 then transmits the updated model data to the distribution module 800, which activates a distribution tool 810 to notify all networked devices (e.g., devices 100, 110, 120, as previously described herein) of the updated optimization. Various embodiments of these modules and their interaction are described in more detail below in relation to FIGS. 5-10.

In a particular embodiment, the program modules 400, 500, 600, 700, and 800, are executed by the network planning tool server 200 and are configured to generate one or more graphical user interfaces accessible to users of the network planning tool 201 and the system architecture 20 associated therewith. Exemplary interfaces are described in more detail below in relation to FIGS. 11-20. In certain embodiments, the user interfaces may be accessible via one or more networks 130, which may include the Internet or other feasible communications network, as previously discussed. In other embodiments, one or more of the modules 400, 500, 600, 700, and 800 may be stored locally on one or more of the distributed computing devices 100, the distributed handheld devices 110, and/or the central computing devices 120, and may be executed by one or more processors of the same. According to various embodiments, the modules 400, 500, 600, 700, and 800 may send data to, receive data from, and utilize data contained in, a database, which may be comprised of one or more separate, linked and/or networked databases.

Also located within the network planning tool server 200 is a network interface 260 for interfacing and communicating with other elements of the one or more networks 130. It will be appreciated by one of ordinary skill in the art that one or more of the network planning tool server 200 components may be located geographically remotely from other network planning tool server 200 components. Furthermore, one or more of the network planning tool server 200 components may be combined, and/or additional components performing functions described herein may also be included in the network planning tool server 200.

While the foregoing describes a single processor 230, as one of ordinary skill in the art will recognize, the network planning tool server 200 may comprise multiple processors operating in conjunction with one another to perform the functionality described herein. In addition to the memory 220, the processor 230 can also be connected to at least one interface or other means for displaying, transmitting and/or receiving data, content or the like. In this regard, the interface(s) can include at least one communication interface or other means for transmitting and/or receiving data, content or the like, as well as at least one user interface that can include a display and/or a user input interface. The user input interface, in turn, can comprise any of a number of devices allowing the entity to receive data from a user, such as a keypad, a touch display, a joystick or other input device.

While reference is made to a network planning tool "server" 200, as one of ordinary skill in the art will recognize, embodiments of the present invention are not limited to traditionally defined server architectures. Still further, the system of embodiments of the present invention is not limited to a single server, or similar network entity or mainframe computer system. Other similar architectures including one or more network entities operating in conjunction with one another to provide the functionality described herein may likewise be used without departing from the spirit and scope of embodiments of the present invention. For example, a mesh network of two or more personal computers (PCs), similar electronic devices, or handheld portable devices, collaborating with one another to provide the functionality described herein in association with the network planning tool server 200 may likewise be used without departing from the spirit and scope of embodiments of the present invention.

According to alternative embodiments (not shown), components of the flow validation server may be located geographically remotely from other components of the flow validation server. In addition, in accordance with other embodiments (not shown), one or more of the components may be combined, and additional or fewer components performing functions described herein may be included in the flow validation server. Of course, many other alternatives and architectures are possible and can be used to practice various embodiments of the present invention. According to various embodiments, many individual steps of a process may or may not be carried out utilizing the computer systems described herein, and the degree of computer implementation may vary.

Network Planning Tool Server 200 Logic Flow

Figure 3:
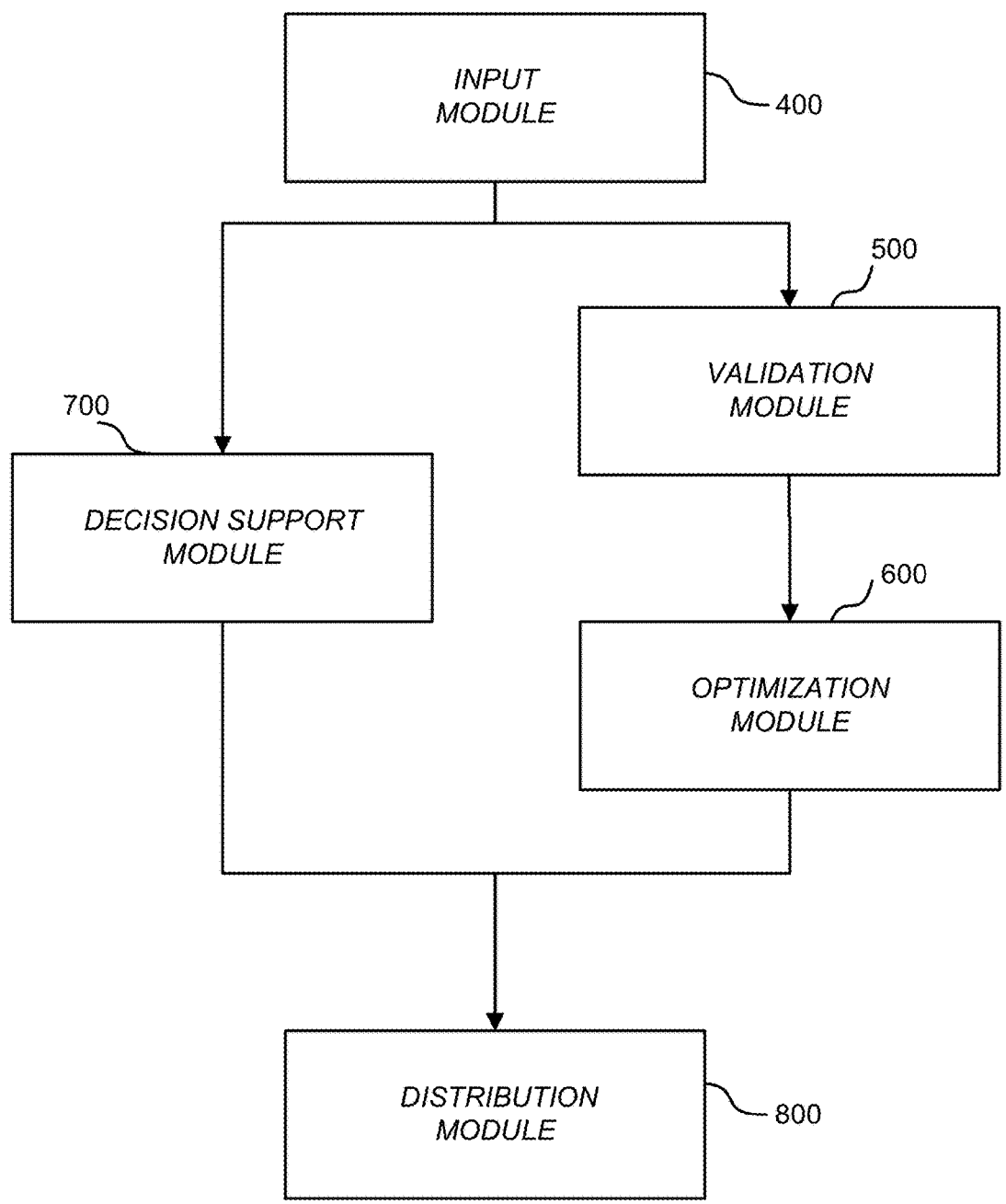
FIG. 3 illustrates an overall process flow for consolidated network planning via the network planning tool 201 according to various embodiments.

Reference is now made to FIGS. 3 and 5-10, which illustrate various logical process flows executed by various embodiments of the modules described above. In particular, FIG. 3 illustrates the overall relationship of the modules 400, 500, 600, 700, and 800 of the network planning tool server 200, according to various embodiments. As illustrated, operation of the network planning tool 201 and the system architecture 20 associated therewith begins, according to various embodiments, with the execution of the input module 400, which determines the nature of the update necessary by newly input data (see input data 419 in FIG. 5). If a global model update is requested, the input module 400 passes control to the validation module 500, and in turn to the optimization module 600. If a focused or limited update is all that is necessary, the input module 400 notifies the decision support module 700, which is then executed to perform the limited update, as appropriate. Once either global or limited updates are completed by the optimization module 600 and/or the decision support module 700, control is passed to the distribution module 800. Steps performed by various embodiments of the input module 400 are described in relation to FIG. 6; steps performed by various embodiments of the validation module 500 are described in relation to FIG. 7; steps performed by various embodiments of the optimization module 600 are described in relation to FIG. 8; steps performed by various embodiments of the distribution module 800 are described in relation to FIG. 9; and steps performed by various embodiments of the decision support module 700 are described in relation to FIG. 10.

Figure 4:
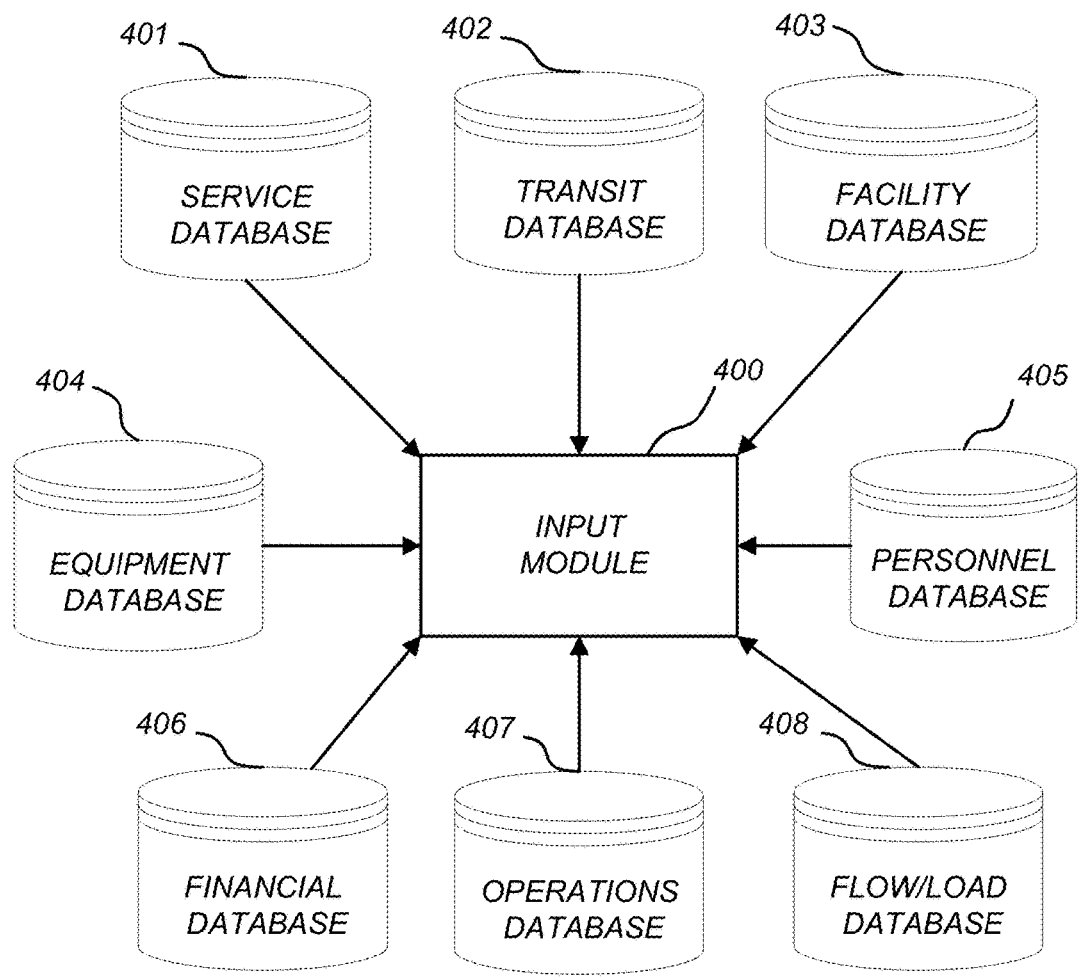
FIG. 4 illustrates a schematic diagram of various databases that are utilized by the system architecture 20 shown in FIG. 1 according to various embodiments.

As described in more detail below in relation to FIGS. 4 and 5, the input module 400, according to various embodiments, retrieves existing model data 410 from one or more databases in communication with the module 400. FIG. 4 illustrates a block diagram of various exemplary databases from which the input module 400 retrieves this information. In particular, in at least the embodiment shown in FIG. 4, the following databases are provided: a service database 401, a transit database 402, a facility database 403, an equipment database 404, a personnel database 405, a financial database 406, an operations database 407, and a flow/load database 408. Although the embodiment of FIG. 4 shows these databases 401, 402, 403, 404, 405, 406, 407, 408 as being separate databases each associated with different types of data, but in various other embodiments, some or all of the data may be stored in the same database.

It should be appreciated that the various illustrated databases may encompass data previously maintained by one or more separate transportation network planning products, so as to facilitate consolidation and integration of the same within the single network planning tool 201 and associated system architecture 20 described herein. As a non-limiting example, the one or more databases described herein may consolidate and integrate data previously accessible via multiple transportation network systems (e.g., air versus ground transportation, national versus international transportation, and the like). Under prior configurations, if a user wished to, for example, analyze data related to particular services and also facilities, separate and often duplicative analyses were generally necessary. Still further, the independent nature of such systems prevented seamless integration and optimization of changes made in each of the transportation network systems. The unified network planning tool 201 and associated system architecture 20 described herein provide a single tool to effectively and efficiently plan and execute all transportation networks and products together, at least in part, by consolidation of at least the various non-limiting exemplary databases.

According to various embodiments, the service database 401 may be configured to store and maintain data related to the types a nature of service provided by a particular carrier-provider using the network planning tool 201 and associated system architecture 20. In certain embodiments, the service-related data may comprise at least delivery type data (e.g., single day express, two day, three day, standard ground delivery, standard freight, next day freight, deferred freight, etc.) and package type data (e.g., small package, standard package, oversized package, freight, etc.). In these and still other embodiments, the service-related data may also comprise data denoting availability of one or more delivery type service, as described above, relative to one or more transit routes, as defined and managed within the transit database 402. As non-limiting example, the service-related data may indicate availability of same day express delivery in a predominantly urban area, while not offering such in a predominantly rural and/or remote area. A variety of alternatives could exist, as commonly known and understood in the art. Still further, various embodiments of the service database 401 comprise data related to service exceptions, as such may be generally defined and/or predetermined for certain applications.

According to various embodiments, the transit database 402 may be configured to store and maintain data related to types of transit services availability, along with details regarding respective various routes, whether by air, ground, water, or otherwise. In this manner, it should be understood that the transit database 402 may consolidate a variety of transit-related data that may have previously been located in one or more of the distinct and separately maintained multiple transportation network systems. In certain embodiments, in addition to identifying various routes by type, geography, and/or priority, the transit database 402 may further identify availability of particular routes, possible alternative flows and/or routes, along with various transit or route exceptions that may exist, comparable to the service exceptions previously described herein.

According to various embodiments, the facility database 403 may be configured to store and maintain data related to multiple facilities through which shipping service, transit, and/or operations are provided by a particular carrier-provider using the network planning tool 201 and associated system architecture 20. The data may comprise information regarding the type of facilities within the consolidated and integrated network (e.g., warehouse, service hub, airport, transit link, etc.), the capacity of the facilities (e.g., flow volume on an equipment, personnel, or load basis, or otherwise), the real-time availability of the facilities (e.g., as based upon existing demands, etc.), and even exceptions related to particular facilities (e.g., national holiday for facility in Mexico which is not celebrated by, for example, related US facilities). It should be understood, of course, that any of a variety of facility related data may be collected and stored within the facility database 403 for use by the integrated network planning tool 201, as may be desirable for particular applications.

According to various embodiments, the equipment database 404 may be configured to store and maintain data related to multiple pieces of equipment utilized across the multiple transportation networks. Such equipment may include, but is not limited to aircraft, vehicles, freight containers, forklifts, packaging materials, and the like. The availability of particular equipment, including exceptions thereto, as may be predetermined according to various parameters, may also be included for purposes of modeling flow simulations of the transportation networks integrated within the network planning tool 201 and associated system architecture 20. The personnel database 405 may be similarly configured according to various embodiments and contain various data related to at least the number, the type, the location, the availability, and the future needs of personnel necessary to maintain the flow modeled across the multiple transportation networks via the network planning tool 201.

According to various embodiments, the financial database 406 may be configured to store and maintain data related to costs and financial-related information for operation of the multiple transportation networks. Such data may include the non-limiting examples of service cost data (e.g. actual shipping costs, charged shipping costs, etc.), transit cost data (e.g., gas costs, vehicle maintenance costs, driver salary costs, etc.), facility cost data (e.g., operations costs, utility costs, personnel costs, etc.), and equipment cost data (e.g., maintenance, repair, replacement, etc.).

According to various embodiments, the operations database 407 may be configured to store and maintain data related to the operational logistics of the multiple transportation networks integrated under the umbrella of the network planning tool 201 and associated system architecture 20. In certain embodiments, the logistical related data may include the non-limiting examples of shipping region maps, geographical area restrictions, holiday (or other) exceptions to logistical planning calendars, regional regulations and standards that may impact transit time and/or other parameters, and any of a variety of exceptions, as may be defined by one or more predetermined parameters or otherwise.

According to various embodiments, the flow/load database 408 may be configured to store and maintain data related to historical flow models created, updated, validated, and/or optimized with the network planning tool 201 and associated system architecture 20. Such may inform optimization models produced via the tool 201 when applied to newly input data 419 (see FIG. 5), as will be described in further detail below. The flow/load database 408 may be further configured in certain embodiments to maintain and store various reports, charts, and summaries produced by the network planning tool 201 or otherwise, for use as reference, when such may be desirable for particular applications.

According to various embodiments, any of the previously described databases may be configured to store and maintain not only textually based data (e.g., cost figures, facility identification data, etc.), but also graphically based data, such as the non-limiting examples of geographical area maps, designating not only service areas, but transit facility hubs located and available therein and equipment dedicated and/or available for use within particular areas. In this manner, the graphically based data may be used to visually combine the data contained within two or more databases, as illustrated in at least FIGS. 11-12, as will be described in further detail below.

As an additional non-limiting example of the inter-relational nature of the various databases, in a particular embodiment, for each geographical area, time-in-transit data may be maintained and stored, including the number of days expected to transport a package from one shipping facility to a particular destination. Transit data, when referenced for flow modeling purposes, may thus be informed not only by route distance data maintained and stored within the transit database 403, but also by facility related data maintained and stored within the facility database 403, and even further by equipment or personnel related data maintained and stored within the equipment and personnel databases 404, 405, and even further by the operations database 407 information related to regional holidays, regulations, and/or standards that may influence transit time calculations.

Exemplary System Operation

As indicated above, various embodiments of the network planning tool server 200 execute various modules (e.g., modules 400, 500, 600, 700, 800) to simulate and model distribution flows of a consignor's packages from each of one or more hubs within the carrier's shipping network and facilitate generation of an optimal network plan for the handling thereof, taking into account a plurality of factors and considerations (e.g., data and information), as retrieved from the above-described various databases and/or as provided by one or more users of the network planning tool 201 and/or the system architecture 20 associated therewith.

Figure 5:
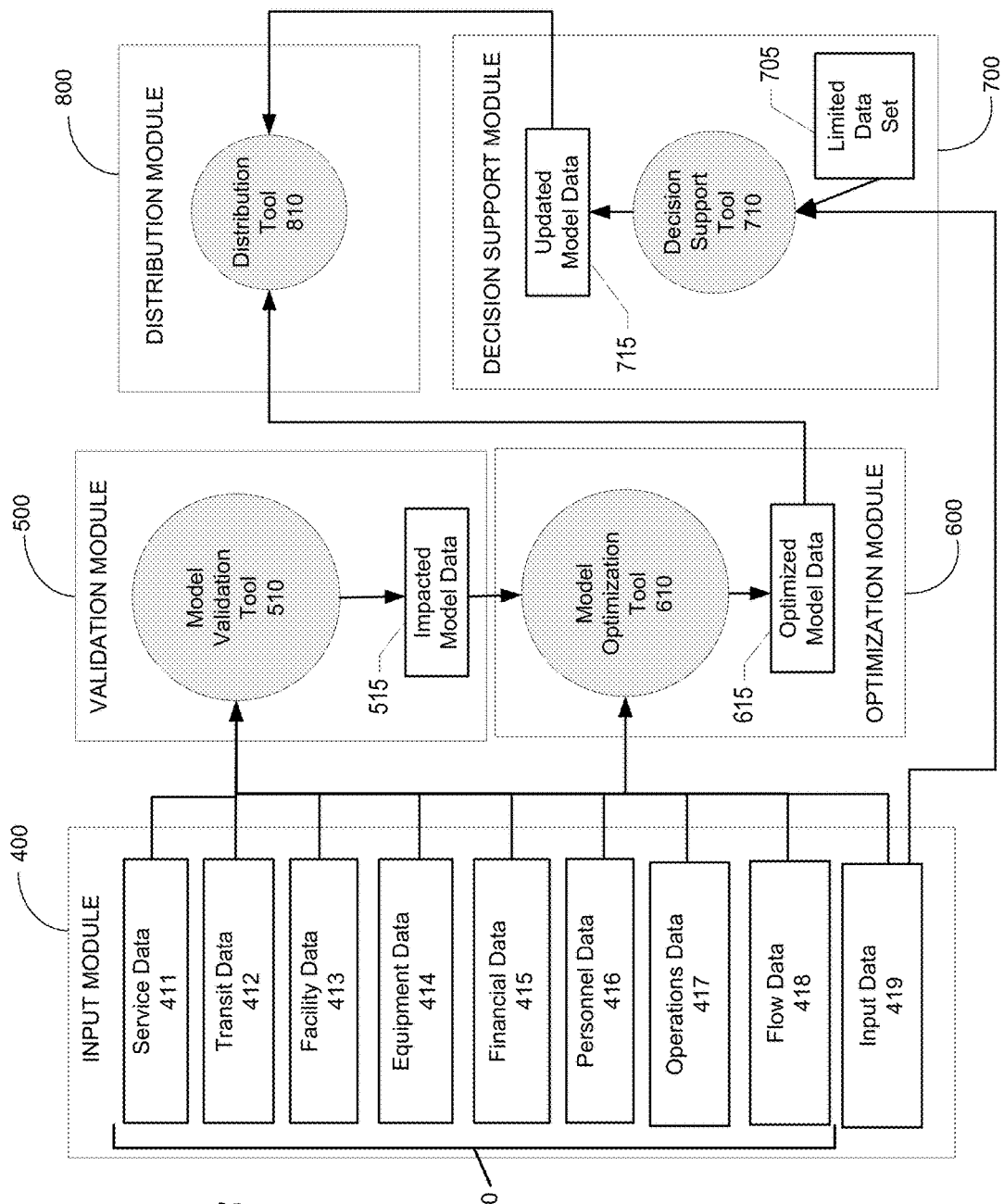
FIG. 5 is a schematic block diagram of the input module, the validation module, the optimization module, the decision support module, and the distribution module shown in FIG. 2 according to various embodiments.

According to the embodiment shown in FIG. 5, the network planning tool server 200 begins with the execution of the input module 400, which retrieves, stores, and manages a myriad of data associated with the shipping network. When updates are made or new data is received, the input module 400 is generally configured to determine whether the change requires a global or a limited optimization of the network model. If a global model update is requested, the input module 400 passes control to the validation module 500, and in turn to the optimization module 600. If a focused or limited update is all that is necessary, the input module 400 notifies the decision support module 700, which is then executed to perform the limited update, as appropriate. Once either global or limited updates are completed by the optimization module 600 and/or the decision support module 700, control is passed to the distribution module 800. Steps performed by each of these modules will now be described in further detail.

Input Module 400

According to various embodiments, the input module 400 is configured to receive, store, and maintain existing transportation network data 410. In certain embodiments, as may be understood from FIG. 5, the input module 400 is configured to provide the existing data 410 to the validation module 500 and the optimization module 600. In at least one embodiment, the input module 400 may be configured to provide at least at least some portion of the data 410 to the decision support module 700, as requested for population of a limited data set 705, as will be described in further detail elsewhere herein.

Figure 6:
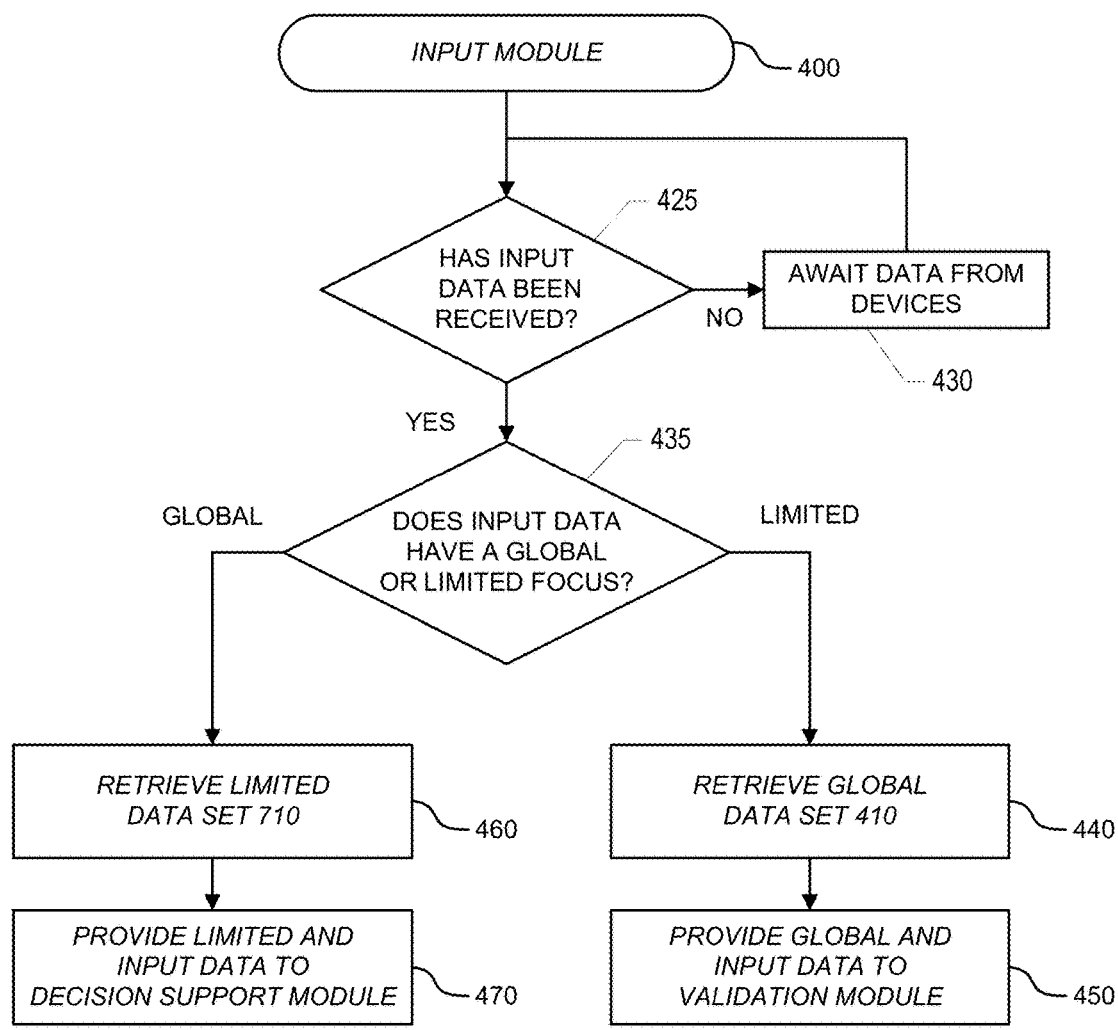
FIG. 6 illustrates a process flow for the input module shown in FIG. 2 according to various embodiments.

FIG. 6 illustrates steps that may be executed by the input module 400 according to various embodiments. Beginning with step 425, the input module 400 assesses whether any input data 419 has been received by the module. In certain embodiments, the input module 400 makes this assessment by periodically scanning one or more databases associated with the module (e.g., see FIG. 4) and by identifying some portion of data within one or more of the databases that was not present during a previous periodic scan under step 425. In various embodiments, if new or input data 419 is identified, the input module 400 proceeds to step 435; otherwise the module proceeds into a static loop via step 430.

In various embodiments, the existing transportation network data 410 comprises a variety of shipping and transportation related data located within one or more databases (see FIG. 4) and as previously described herein. As illustrated in at least FIG. 5, however, the data 410 may comprise the non-limiting examples of service data 411, transit data 412, facility data 413, equipment data 414, financial data 415, personnel data 416, operations data 417, and shipping and transportation flow/load modeling data 418. In various embodiments, each of the pieces of the data 410 enable shipping carriers (e.g., common carriers, such as United Parcel Service, Inc. (UPS), FedEx, United States Postal Service (USPS), etc.) to monitor, maintain, and model various aspects of multiple package shipping and transportation processes. Notably, the input module 400 of the network planning tool 201 provides a mechanism by which all of the data 410 is consolidated and available for integration via any of the validation, optimization, and/or decision support modules 500, 600, 700, as will be described in greater detail below.

In various embodiments, the input module 400 is further configured to receive various pieces of input data 419. In certain embodiments, the input data 419 may comprise any one of the non-limiting examples of adding a new level of service to a particular geographically defined region, opening a new transportation hub for a particular geographically defined region, reapportioning load volumes and routes associated with particular geographically defined regions, and/or modifying anticipated package volumes for particular geographically defined regions based upon futuristic estimates. Of course, still other variations and types of input data 419 may be envisioned, as may be commonly known and understood in the context of system and flow modeling and simulation applications.

Indeed, according to various embodiments, the input module 400 is configured in step 435 to assess whether the input data has global or limited implications, relative to the multiple transportation networks integrated within the network planning tool 201 and associated system architecture 20. In certain embodiments, the assessment may be made by querying a user of the tool whether a global or limited inquiry is desired. In other embodiments, the assessment may be made internally to the input module 400, whereby, for example, the input module may be configured to assess the content of the input data and automatically analyze whether such is globally or locally focused in nature. In at least one embodiment, such an assessment may be based upon historical data acquired and stored by the input module 400 during use over an extended period of time, while in still other embodiments such may be informed, at least in part, by pre-established and/or predetermined parameters.

Where a global inquiry is identified, the input module 400 is configured to proceed to step 440, wherein a global data set 410 (e.g., comprising the various data 411-418 as previously described herein) are retrieved and provided, together with the global input data 419 to the validation module 500 for further processing, as will be described in greater detail below. Alternatively, where a limited inquiry is identified, the input module 400 is configured to proceed to step 460, wherein only a limited data set 710 (e.g., comprising only a pertinent portion of the various data 411-418 as previously described herein) are retrieved and provided, together with the limited input data 419 to the decision support module 470 for further processing, as will be described in greater detail below.

As a first non-limiting example of globally-focused data, which will be carried throughout herein, a user of the network planning tool 201 may provide input data 419 comprising an addition of an entirely new service level, such as next day air service, to a geographical transit area previously defined as only having next day ground service, with only standard three day air service. Such an addition may be based upon, for example, opening of a new air service terminal within the geographical transit area or the expansion of an existing terminal so as to facilitate expanded service. Such input data 419 has the potential to impact flow and planning data for the integrated multiple transportation networks in a global manner, and as such, the input module 400, upon assessing the same, is configured, in step 450 to provide the globally focused input data 419 (e.g., an addition of an entirely new service level) to the validation module 500.

As a second non-limiting example of limited-focused data, which will be returned to later herein in the context of describing the decision support module 700, a user of the network planning tool 201 may provide input data 419 comprising removing of a load from week 16 on a calendar due to, for example, illness and irreplaceability of a driver for the load. Recognizing the limited focus of such data, the input module 400 may be, according to various embodiments, configured to provide such to the decision support module 700 for focused analysis, as opposed to the validation module 500 for global analysis. Still other non-limiting examples of limited focused input data 419 may comprise an inquiry regarding alternative flow paths for a particular package, impact to a particular facility for a particular duration of time, impact of sort bypass, and/or lane enhancement inquiries, all as will be described elsewhere herein in the context of the decision support module 700.

Validation Module 500

Figure 7:
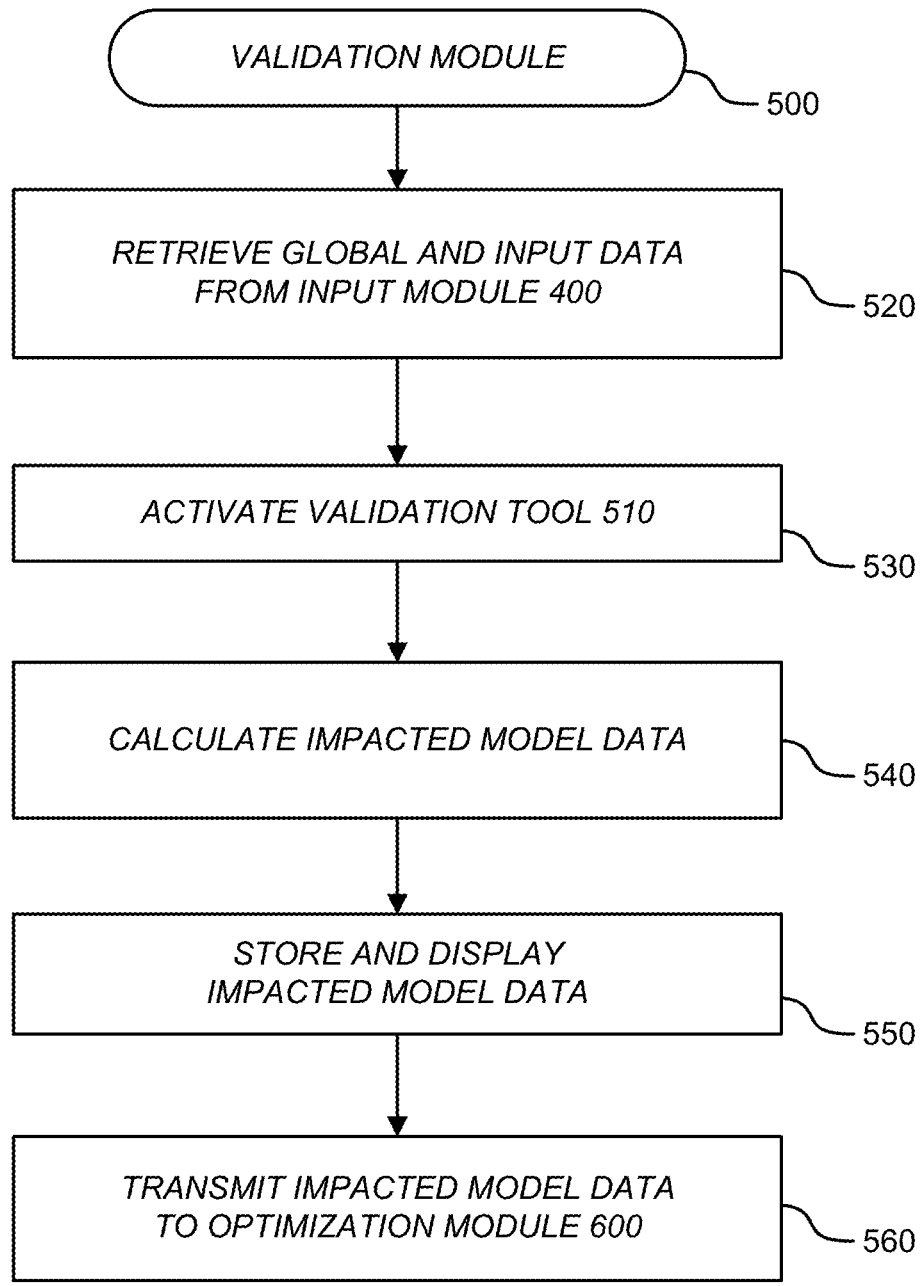
FIG. 7 illustrates a process flow for the validation module shown in FIG. 2 according to various embodiments.

With reference to FIG. 7, according to various embodiments, the validation module 500 is configured to receive and/or retrieve global data 410 and input data 419 in step 520, after which the module proceeds in step 530 to activate a validation tool 510. The validation tool 510 in certain embodiments is configured, as denoted by step 540, to calculate impacted model data within the global data 410 contained within the various databases (see FIG. 4) of the multiple transportation networks integrated within the network planning tool 201.

Remaining with the previous non-limiting example of globally-focused input data 419, the validation tool 510 is configured to merge the input data 419 comprising addition of an entirely new service level (e.g., next day air) with the existing global data 410, as retrieved from the input module 400. As should be understood, the addition of an entirely new service level will enable the particular geographical area to provide a broader scope of service, such that, for example, air freight deliveries previously limited to standard (e.g., three day) air delivery could now possibly be transported in a more efficient and/or timely fashion. As such, the model data, wherein a particular volume of standard air delivery and/or next day ground delivery data exists, may be impacted, such that those volumes may be potentially adjustable based upon the addition of a new service level. Alternatively, as yet another non-limiting example, consider wherein the input data 419 is the removal of a particular service level from a particular geographical region, in which case the model data would be potentially negatively impacted (versus the potentially positive impact resulting from a service addition).

Figure 11:
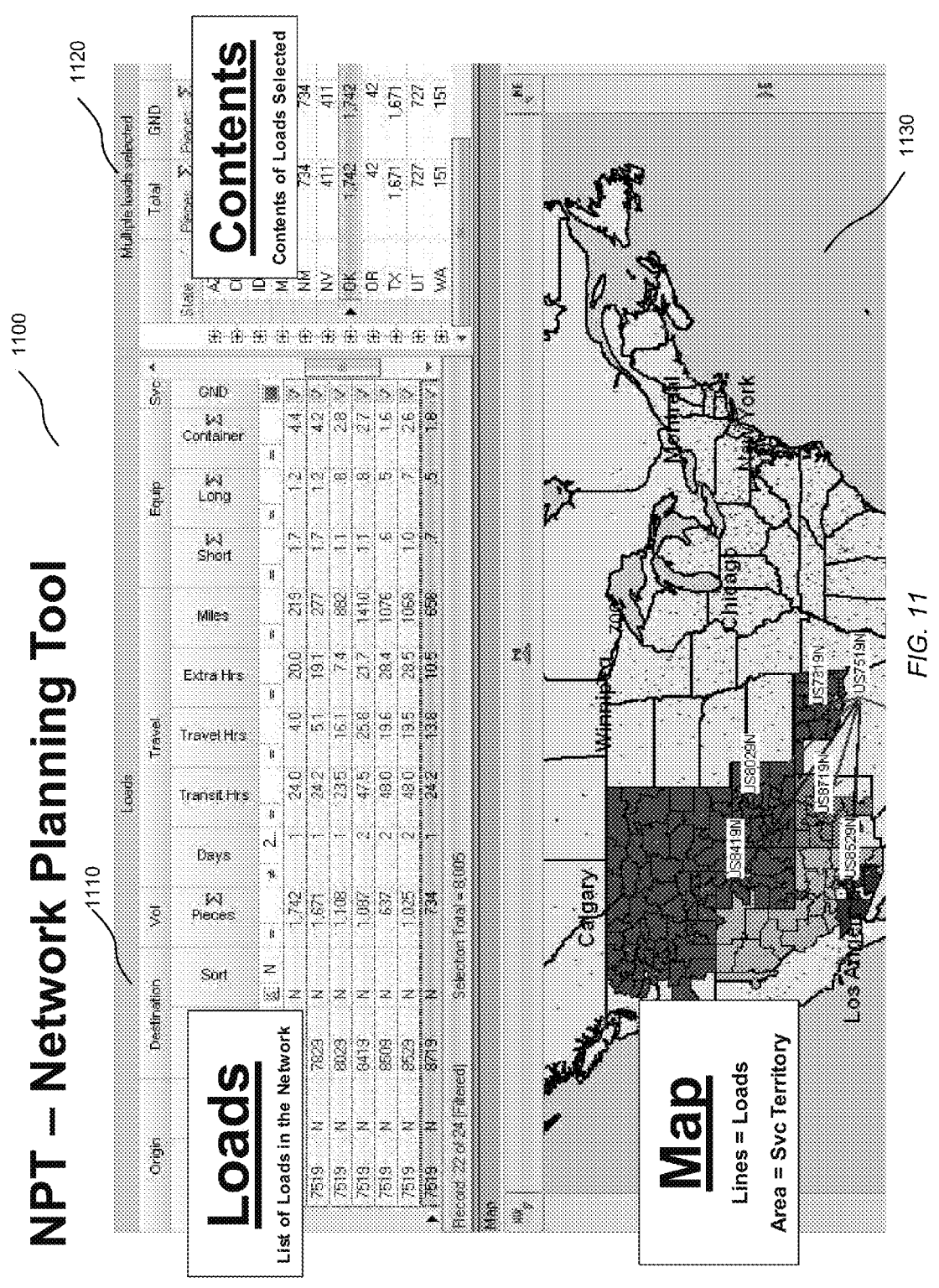
Figure 12:
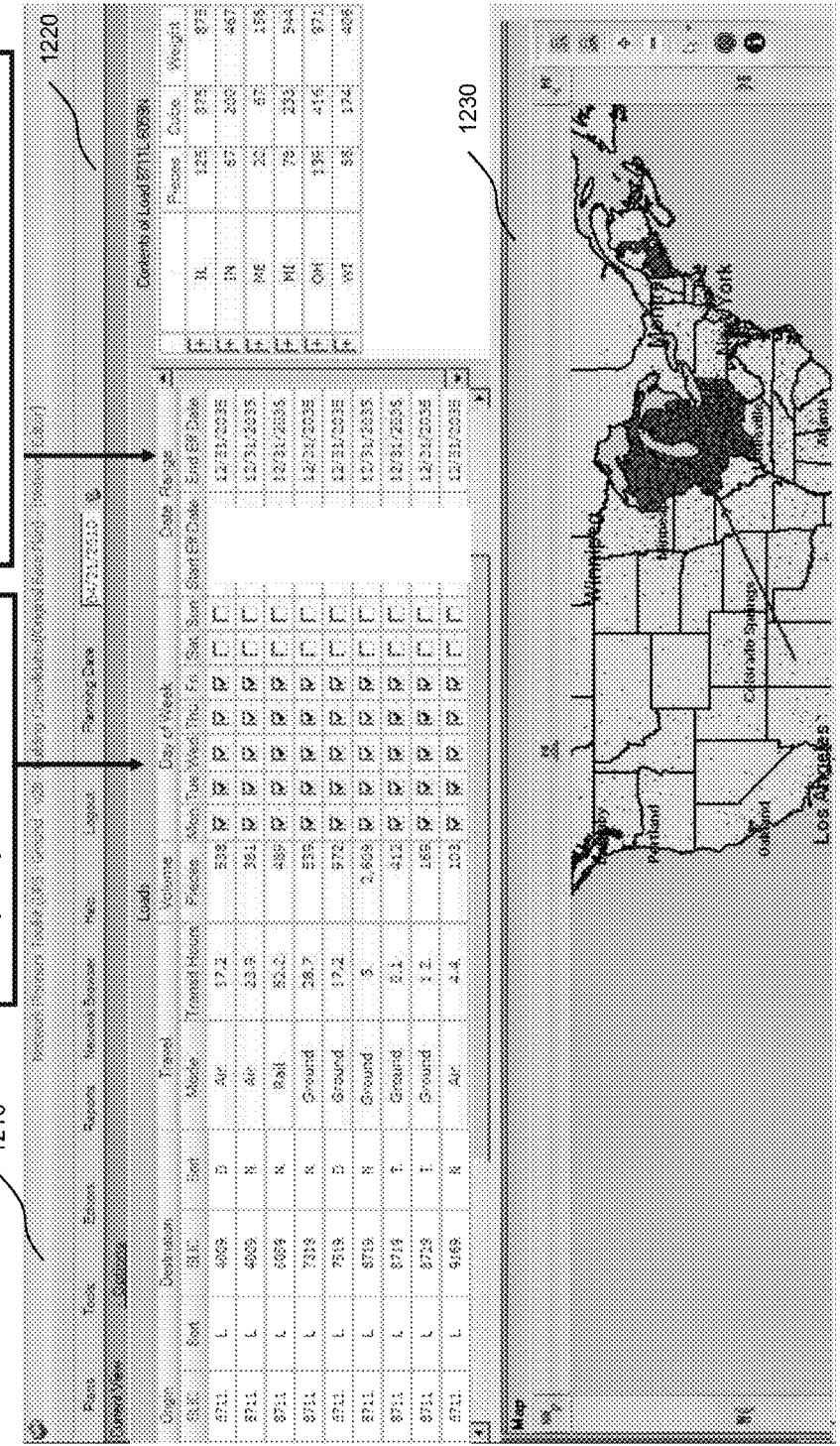
FIG. 12 is an exemplary screen display of a flow management screen 1200 of an operator interface of the network planning tool according to various embodiments.
Figure 13:
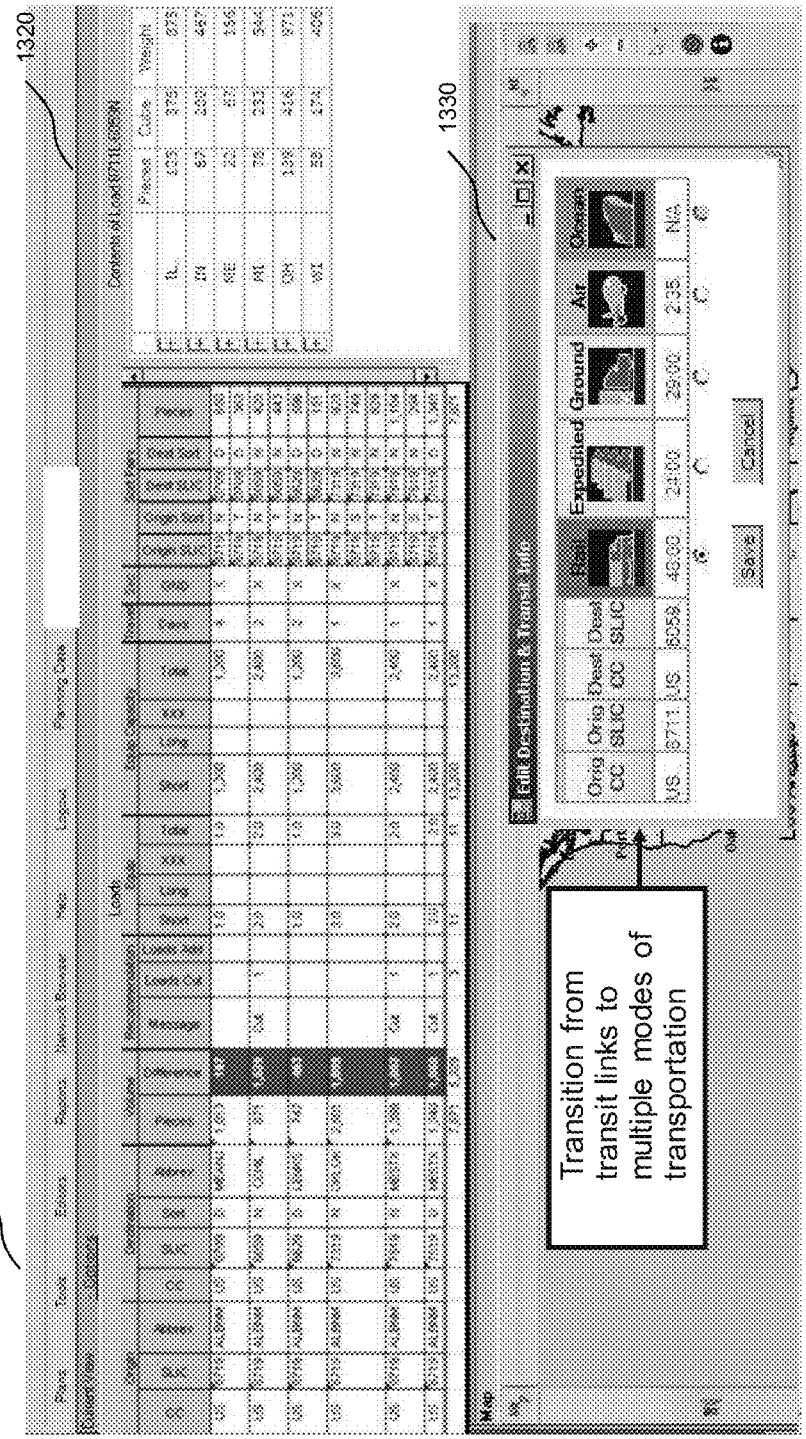
FIG. 13 is an exemplary screen display of a load management screen 1300 of an operator interface of the network planning tool according to various embodiments.

In either of the above-described non-limiting scenarios and still others as may exist according to various embodiments, the validation module 500 is configured, once impacted model data is identified in step 540 (see FIG. 7), to store and display to a user the impacted model data in step 550. Various illustrations of display screens accessible to a user of the network planning tool 201 are shown in FIGS. 11-13, wherein tabular summary tables (e.g., 1110, 1210, and 1310), tabular detail tables (e.g., 1120, 1220, and 1320), and graphical geographical area maps (e.g., 1130, 1230, 1330) are provided for user manipulation and/or reference, all as will be described in further detail below.

Returning to FIG. 7, with continued reference to step 540, it should be understood that in various embodiments, the validation module 500 may be configured to automatically calculate impacted model data based at least in part upon the retrieved global data 410 and the input data 419. In certain embodiments, however, the validation module 500 may be configured to prompt a user of the network planning tool 201 to manually select activation of the validation tool 510, as may be desirable for particular applications, wherein for example, confirmation of the data set being validated may be desirable. In still other embodiments, the validation module 500 may be alternatively configured when activating the validation tool 510, again as may be desirable for various applications.

According to various embodiments, as may be understood with reference to FIG. 7, the validation module 500 may, upon calculation of impacted model data in step 540 proceed further to step 550, wherein the impacted model data is stored (e.g., in one or more databases such as those illustrated in FIG. 4). In certain embodiments, the validation module 500 may be further configured in step 550 to display the impacted data to a user of the network planning tool 201 for user viewing and/or analysis thereof prior to transmittal of the same to the optimization module 600 in step 560. In other embodiments, the validation module 500 may merely display the impacted data for purposes of information (e.g., not requiring any user action prior to proceeding further to, for example step 560). In still other embodiments, the validation module 500 may only store and not display the impacted model data at all, instead proceeding directly to step 560, wherein control of the network planning tool 201 is inherently transferred to the optimization module 600 with the transfer thereto of at least the impacted model data. In this manner, various degrees of near-real-time validation (and/or optimization) may be realized by various embodiments of the network planning tool 201, as compared to the iterative, complex, and oftentimes duplicative validation and optimization process of prior art configurations.

Optimization Module 600

Figure 8:
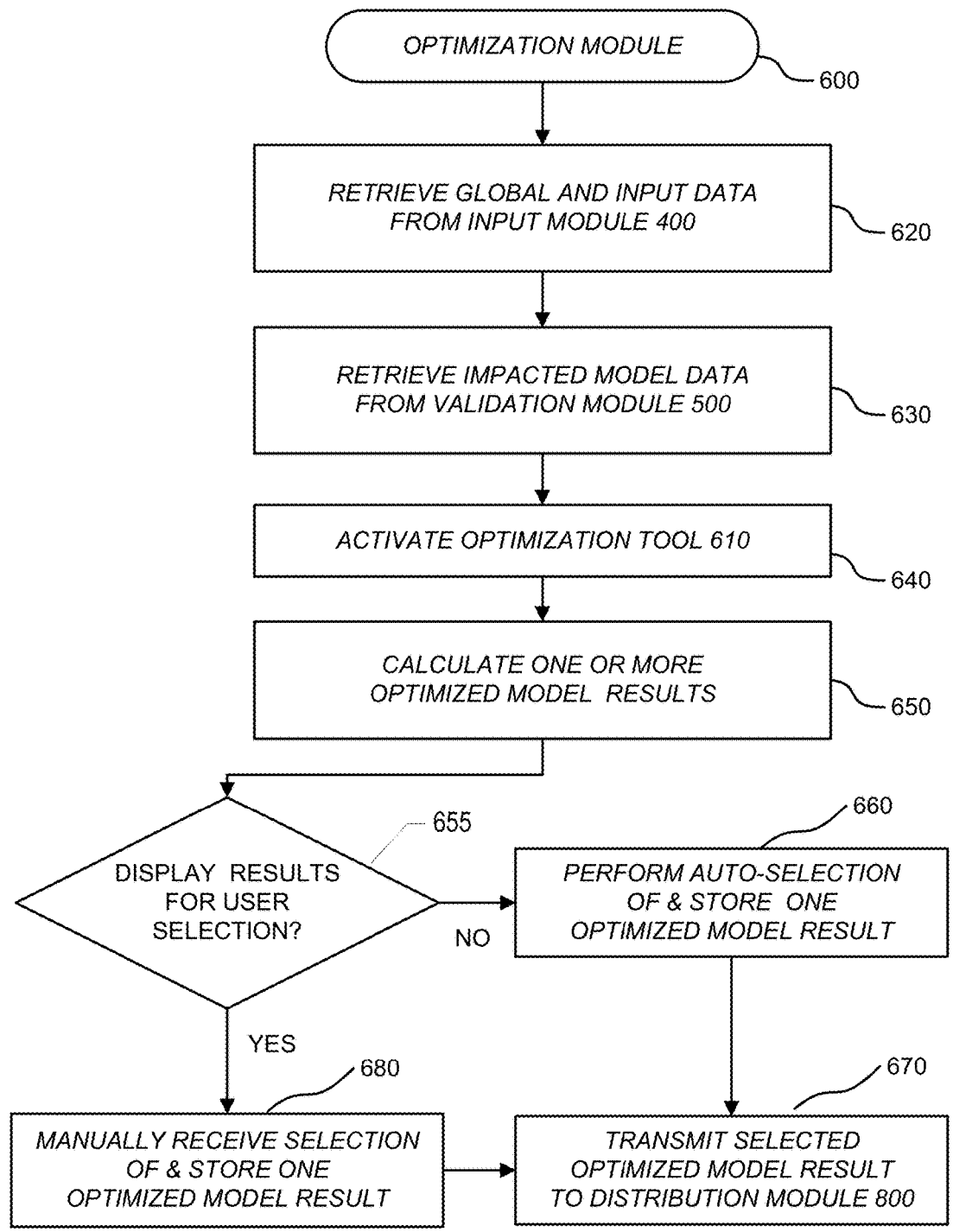
FIG. 8 illustrates a process flow for the optimization module shown in FIG. 2 according to various embodiments.

With reference to FIG. 8, according to various embodiments, the optimization module 600 is configured to receive and/or retrieve global data 410 and input data 419 in step 620 from the input module 400, along with impacted model data from the validation module 500 in step 630. Of course, in certain embodiments, the global and input data may be transmitted to the optimization module 600 by the validation module 500 as opposed to the input module 400, as may be desirable for particular applications. In any of these and still other embodiments, however, it should be understood that the optimization module 600 is configured in step 640 to activate an optimization tool 610 configured to execute one or more algorithms upon the various retrieved and received data.

Remaining with FIG. 8, during step 650, upon activation of the optimization tool 610 in step 640, the optimization module 600 proceeds to execute the one or more algorithms to identify one or more optimized model results, based at least in part upon the impacted model data, the input data 419, and the global data 410. In certain embodiments, the various executed algorithms may be configured to, for example, maximize carrier profits, minimize carrier sort scans, minimize carrier time-in-transit, or the like, for load or packages identified within at least the impacted model data. Returning for a moment to the previous non-limiting examples of adding a particular service level from a certain geographical transit region, the optimization tool 610 may, in at least one embodiment, be configured to create new loads and essentially rebalance the new loads with previously existing loads within that geographical transit region so as to realize an optimal benefit (e.g., maximum efficiency, handling, or the like) from the added service level. Alternatively, where a particular service level is removed from the region, the optimization tool 610 may, in certain embodiments, be configured to rebalance existing loads so as to accommodate packages and loads previously handled by the newly removed service level.

Of course, according to various embodiments, any of a variety of impacted model data and/or input data 419 may be envisioned, in which instance, the optimization tool 610 is operatively configured to execute particular ones of the various pre-configured algorithms, so as to optimize the data model, as may be desirable for particular applications. Indeed, various optimization algorithms exist, as commonly known and understood in the art, including the non-limiting examples of the simplex algorithm (as derived by George Dantzig and designed for linear programming); quadratic algorithms, linear-fractional algorithms, network gradient algorithms, iterative methods (e.g., quasi-newton methods, interior point methods, pattern search methods, and the like), global convergence analyses, heuristic algorithms (e.g., memetic algorithms, differential evolution, dynamic relaxation, particle swarm optimization, and the like), and hub and feeder network optimizations (HFNOs). It should be understood, however, that still other possibilities exist, as the benefit provided by the network planning tool 201 is not merely an optimization algorithm, but the capability of performing near real-time validation and optimization upon multiple integrated transportation networks, as previously described herein.

Returning now to FIG. 8, upon calculating one or more optimized model results in step 650, as based upon one or more optimization algorithms as previously described herein, the optimization module is configured to, in step 655, optionally display the one or more results to a user of the network planning tool 201, for user selection of a single optimized model (see step 680), as may be desirable for particular applications. Indeed, the most desirable optimized model may, at least in part, depend upon particular parameters that may be known only to the user (e.g., not preloaded or pre-established within the network planning tool 201 according to certain embodiments). In other embodiments, of course, it should be understood that the network planning tool 201 may be pre-configured to automatically select a more desirable optimized model based upon one or more predetermined and/or pre-established operating parameters for the multiple integrated transportation networks. In these and still other embodiments, the optimization module 600, instead of proceeding to step 680, may proceed instead to step 660, wherein a single one of the one or more optimized model results is selected.

With reference to our continuing non-limiting example, in the scenario in which a user has added a new service level to a particular geographical region, the optimization module 600 may return five possible optimized model results. One model may globally optimize by imposing an equal distribution of packages from each of the preexisting loads across all of the updated loads, including both those preexisting and those now available due to the new service level. Another model may globally optimize by targeting those previously stressed loads for redistribution and/or rebalancing with the newly available loads, while leaving previously unstressed (e.g., low volume) loads unchanged. Still other models may provide alternative options; however, it should be understood that each may involve varying degrees of efficiency and/or resulting balances of the integrated transportation networks, at least some of which may be less desirable than others for particular applications. As such, where appropriate, the optimization module 600 may provide the user with one or more selectable options for purposes of optimization (see, e.g., steps 655 and 680 of FIG. 8).

According to various embodiments, with reference further to FIG. 8, it should be understood that once a single optimized model result is determined (e.g., whether automatically, manually, or otherwise, as previously described herein), the optimization module 600 is configured to transmit at least the selected optimized model to the distribution module 800 for further processing, as will be described in further detail elsewhere herein. In certain embodiments, the distribution of the optimized model will ensure, at a minimum, near real-time update of the integrated network planning model upon each of the various devices (e.g., 100, 110, 120, etc., each as illustrated in FIG. 1).

Decision Support Module 700

It should be understood that not all input data 419 received by the input module 400 will implicate global-based impacts upon the multiple transportation networks integrated within the network planning tool 201. Indeed, as previously described herein, in certain embodiments, the input data 419 may involve a limited or focused data set, in which case the input module 400 is configured to transmit the same to the decision support module 700 for further processing, as compared to the alternative validation module 500 and optimization module 600 process flows. At least one instance in which localized or focused optimization may be necessary is during the transition from planning to execution, wherein models may require tweaking given real-time impacts and/or changes, thereby likewise requiring near or real-time validation and optimization of required updates, much like that provided on the global scale and as previously described herein.

Figure 10:
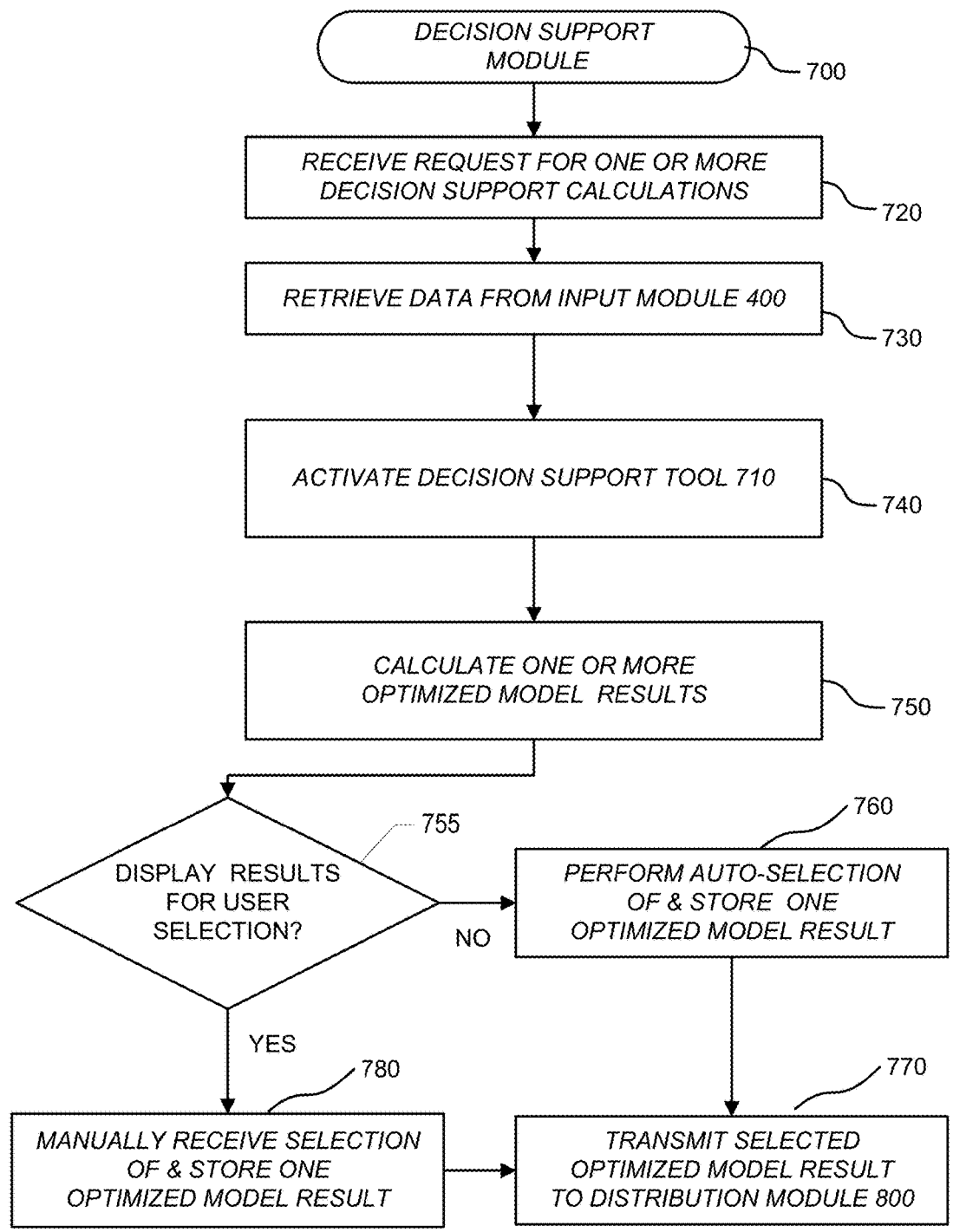
FIG. 10 illustrates a process flow for the decision support module shown in FIG. 2 according to various embodiments.

With particular reference to FIG. 10, the decision support module 700 is configured according to various embodiments to receive a request for one or more decision support calculations from the input module 400, as illustrated in step 720. Once received, the decision support module 700 is configured in certain embodiments to retrieve certain pertinent data from the input module 400, as illustrated in step 730. In at least one embodiment, the decision support module 700 may execute step 730 automatically, while in other embodiments, some degree of user selection of one or more data sets for retrieval may be involved, as may be desirable for particular applications. In any of these and still other embodiments, the retrieved data will comprise at least the input data 419, as provided by a user of the network planning tool 201 to the input module 400.

According to various embodiments, with reference momentarily to FIG. 5, the decision support module 700 may be configured to further retrieve, acquire, or otherwise receive a limited data set 705, which may include some subset of the preexisting model data 410 associated with the multiple transportation networks integrated within the network planning tool 201. For example, in one embodiment, the limited data set 705 may comprise data associated with just a particular load as it is transmitted via the one or more networks, wherein the input data 419 is concerned with altering or modifying that load in some particular fashion. As another non-limiting example, in other embodiments, the limited data set 705 may comprise data associated with a single facility and the loads, equipment, personnel, etc. associated primarily therewith, wherein the input data 419 seeks to alter or modify some aspect of operation for that single facility. What should be understood, is that the decision support module 700, in this manner, provides analysis (e.g., validation and/or optimization modeling) on a smaller, more focused scale than the global validation and optimization previously described herein, as in certain instances, such may be desirable for particular applications.

Figure 16:
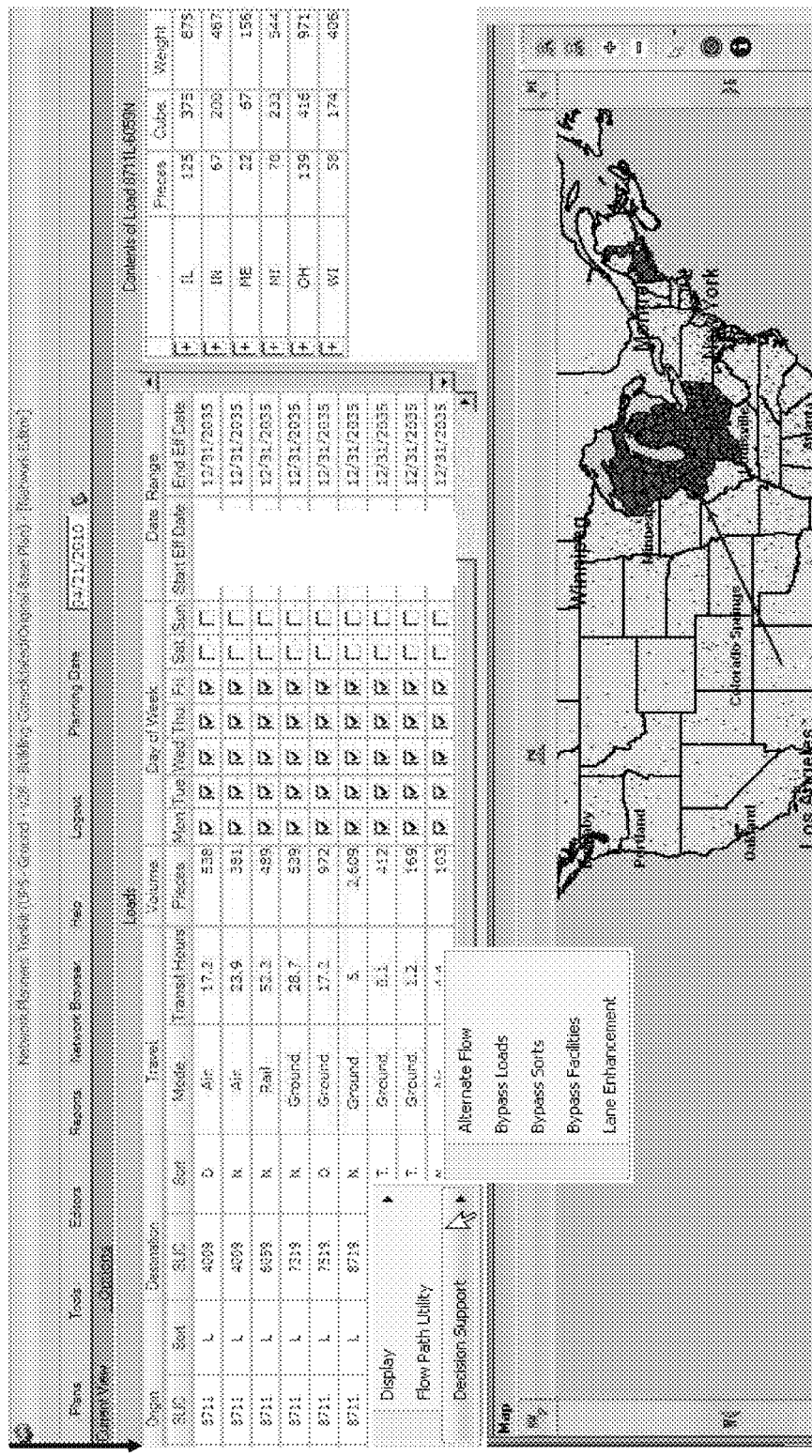
FIG. 16 is an exemplary screen display of a decision support screen 1600 of an operator interface of the network planning tool, as accessed from a load management screen of the network planning tool according to various embodiments.
Figure 20:
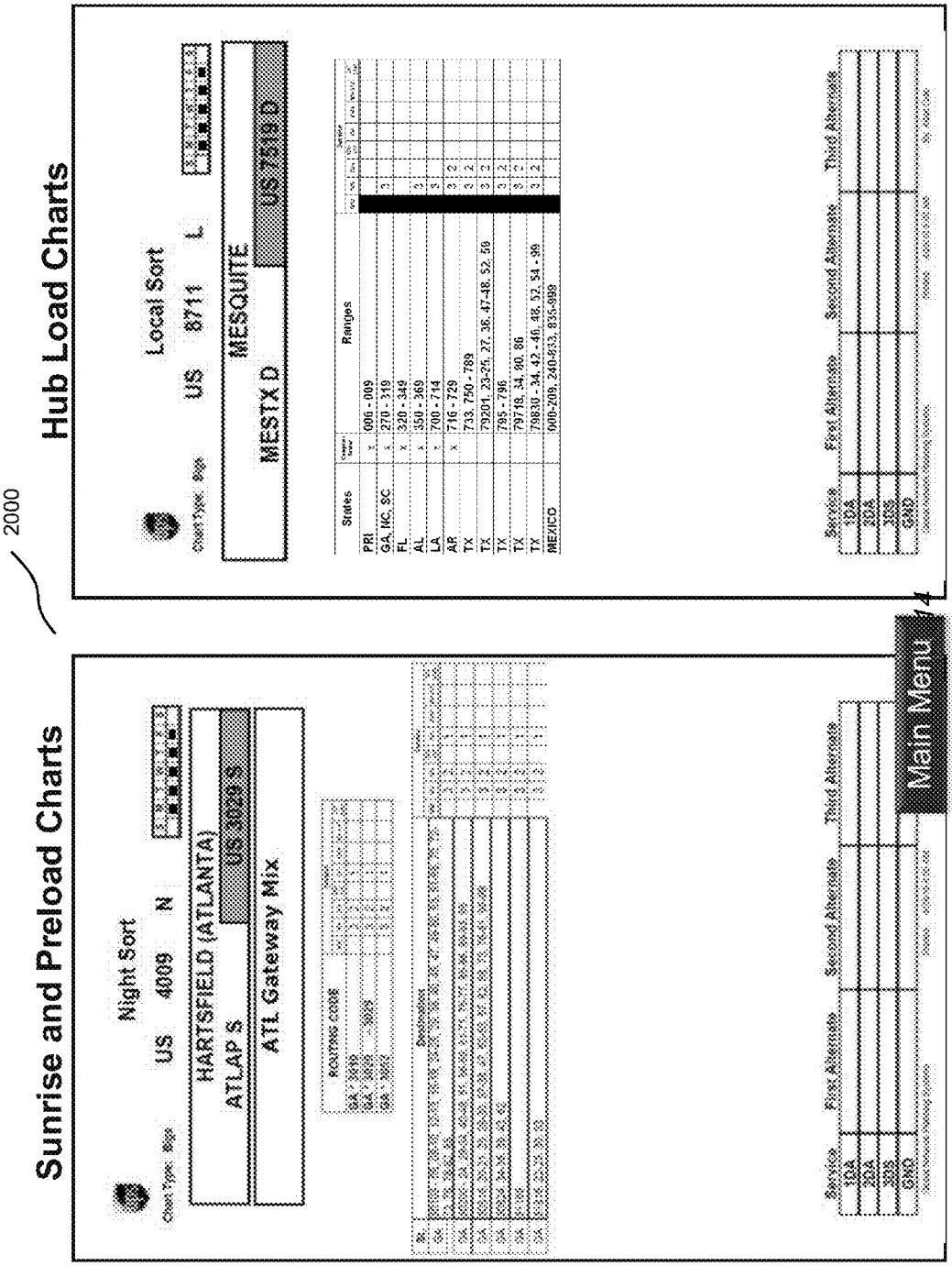
FIG. 20 is an exemplary screen display of exemplary printable charts 2000 of an operator interface of the network planning tool according to various embodiments.

Returning to FIG. 10, once the various pieces of focused data are retrieved or otherwise received by the decision support module 700, the module proceeds to step 740, wherein a decision support tool 710 is activated, as also illustrated in the exemplary user interface screen of at least FIG. 16. The decision support tool 710 may be configured to provide a user with various options, including those shown in FIG. 16, namely alternate flow analysis, bypass load analysis, bypass sort analysis, bypass facilities analysis, and lane enhancement analysis. As a non-limiting example, alternative flow analysis may be necessary where a pre-established flow for a particular package becomes unfeasible, whether by impact, delay, or otherwise, in which case near real-time analysis of alternatives proves invaluable. For example, UPS freight for the Denver Twilight to the Atlanta Night sort may be analyzed to identify alternative flows that load to the Dallas Night, South Holland (Chicago) Night, or the Kansas City Sunrise flows, without impact to commitments for the particular freight at issue.

Continuing with various non-limiting examples, bypass load analysis may similarly involve analysis of redistribution of loads within a single facility where, for example, a driver calls in sick and is unable to perform deliveries on Tuesday. When such is encountered, a user of the network planning tool 201 may access the decision support module 700, whereby the decision support tool 710 is configured to execute one or more validation and/or optimization algorithms (as described elsewhere herein) to determine one or more optimized model results for the localized data set. For example, the decision support tool 710 may return a handful of possible optimization results wherein the packages on the undeliverable load are either evenly distributed across all remaining loads, or allocated to certain remaining loads based on a number of factors, such as proximity of routes, load volume, and the like. It should be understood, however, that in any of these and still other embodiments, the decision support tool 710, regardless of which analysis is performed upon request, is configured, much like the validation and optimization tools 510, 610 described elsewhere herein to provide near real-time validation and optimization of the impacted (albeit in this context limited) data set. In this manner, duplicative, complex, and oftentimes inefficient optimizations upon each of the multiple networks is avoided, via at least the integration thereof within a single network planning tool 201.

Distribution Module 800

Figure 9:
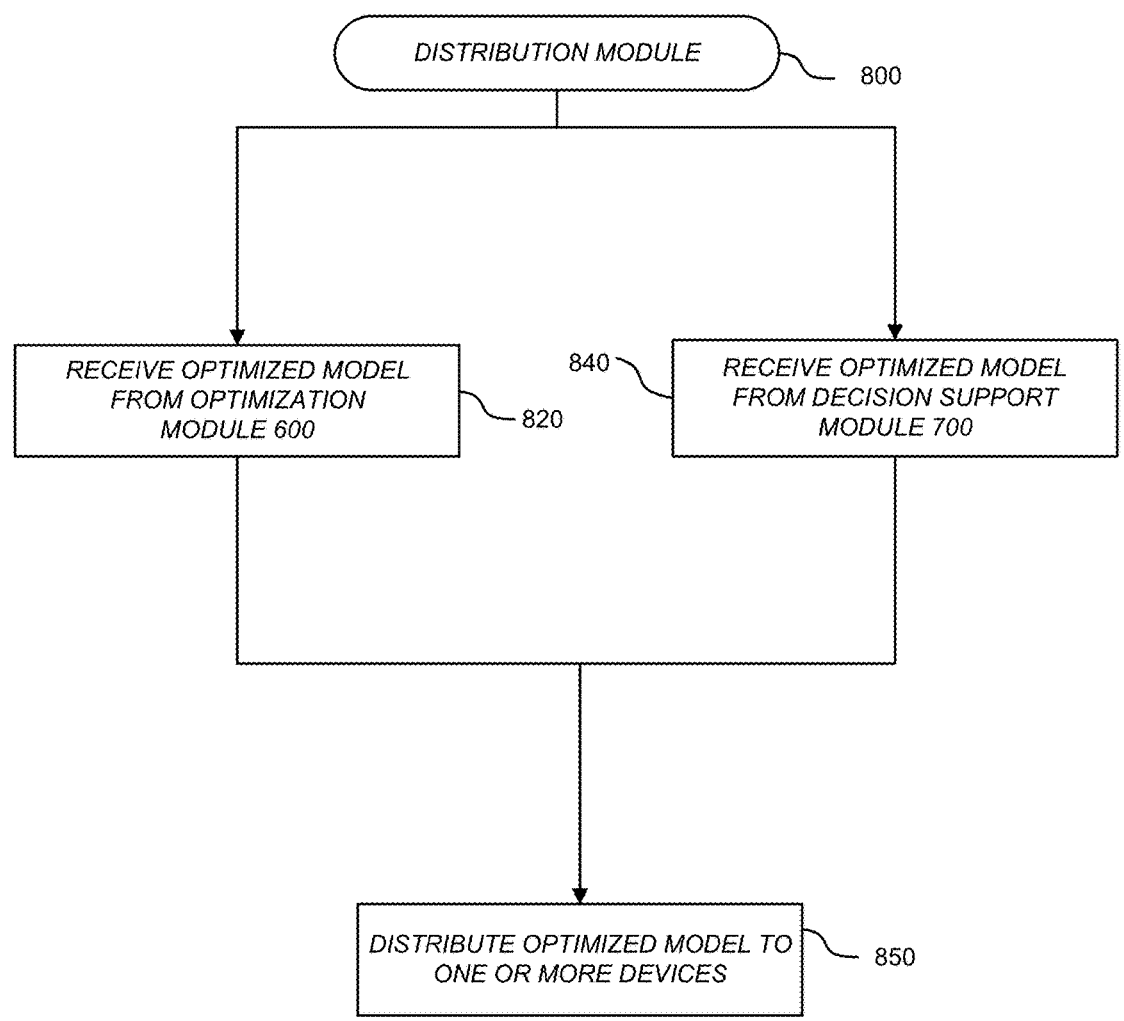
FIG. 9 illustrates a process flow for the distribution module shown in FIG. 2 according to various embodiments.

According to various embodiments, with reference to FIG. 9, the distribution module 800 is configured to receive optimized model data from either the optimization module 600 (see step 820) or the decision support module 700 (see step 840), depending on whether the input data 419 influencing the optimization is global or limited/focused in nature, as has been described elsewhere previously herein. In either scenario, however, it should be understood that the distribution module 800 is configured to ensure that the selected optimized model data is promptly, efficiently, and consistently distributed to each of the devices (e.g., devices 100, 110, 120, etc., as illustrated in FIG. 1) in a near real-time fashion. In this manner, the network planning tool 201 is configured to not only provide near real-time validation and optimization of the data within the multiple transportation networks integrated within the tool, but also to ensure near real-time distribution thereof across all interfaces with the networks. In other words, the network planning tool 201 provides both consistency and efficiency not only during the analysis and change-making process, but also during the implementation thereof.

With continued reference to at least FIGS. 5 and 10, it should be understood that the distribution module 800 may be configured to transmit the optimized model data automatically, upon user prompt, or otherwise, as may be desirable for particular applications. In certain embodiments, the distribution module 800 may be further configured to display one or more summary reports to one or more users, as may be seen in at least the exemplary screen display 1500 of FIG. 15. In other embodiments, one or more notifications may be generated by the distribution module 800 upon transmittal of the optimized model data, thereby alerting (e.g., audibly, visually, via text or email or otherwise, etc.) users of the updates and/or changes being made across the multiple integrated transportation networks of the carrier. Still other embodiments may incorporate any of a variety of notification, alert, or updates to users, as commonly known and understood in the art and as may be desirable for particular applications.

Exemplary Operator/User Interface

Although various operator and user interfaces of the network planning tool 201 have been referenced previously herein, various exemplary screen displays are illustrated in at least FIGS. 11-20, each of which will be further described, in turn, below.

With reference to FIG. 11, an exemplary screen display 1100 of the network planning tool 201 is illustrated. As may be seen, the screen display 1100 may comprise three general portions, namely a summary data table 1110, a detailed data table 1120, and a graphical map 1130. Each provides integrated data for user manipulation and/or analysis. As a non-limiting example, consider the summary data table 1110, which may be configured to provide somewhat "high-level" data regarding a plurality of loads within the one or more networks. To the right thereof (or otherwise configured in alternative embodiments), the detailed data table 1120 provides additional detail regarding particular loads selected by a user for additional evaluation, comparison, validation, and/or optimization. The graphical map 1130 provides a graphical illustration of the loads selected and/or under evaluation, for purposes of visually considering the scope and content of the selected data, versus having such provided only in textual format.

FIG. 12 likewise illustrates an exemplary screen display 1200 of the network planning tool 201, wherein transit flows may be analyzed, as compared to the loads of display 1100. As may be seen, in certain embodiments, load flow may be viewed by day of the week, although in other embodiments, various alternative temporal restrictions may be selected, as may be desirable for particular applications. Summary, detailed, and graphical display portions (e.g., 1210, 1220, and 1230) are similarly provided according to various embodiments, although such may be customizable by a user, as desired, in which case the arrangement and/or display thereof may be altered from that particularly illustrated in exemplary FIG. 12.

FIG. 13 illustrates an exemplary screen display 1300 (likewise similarly apportioned into segments 1310, 1320, 1330, like those for screens 1100 and 1200 previously described herein), illustrating load editing options within the network planning tool 201. As may be seen, a volumetric difference between various loads may be displayed in the summary table portion 1310, which data may be manipulated by editing destination and transit information for particularly selected loads within the graphical screen 1330.

Figure 14:
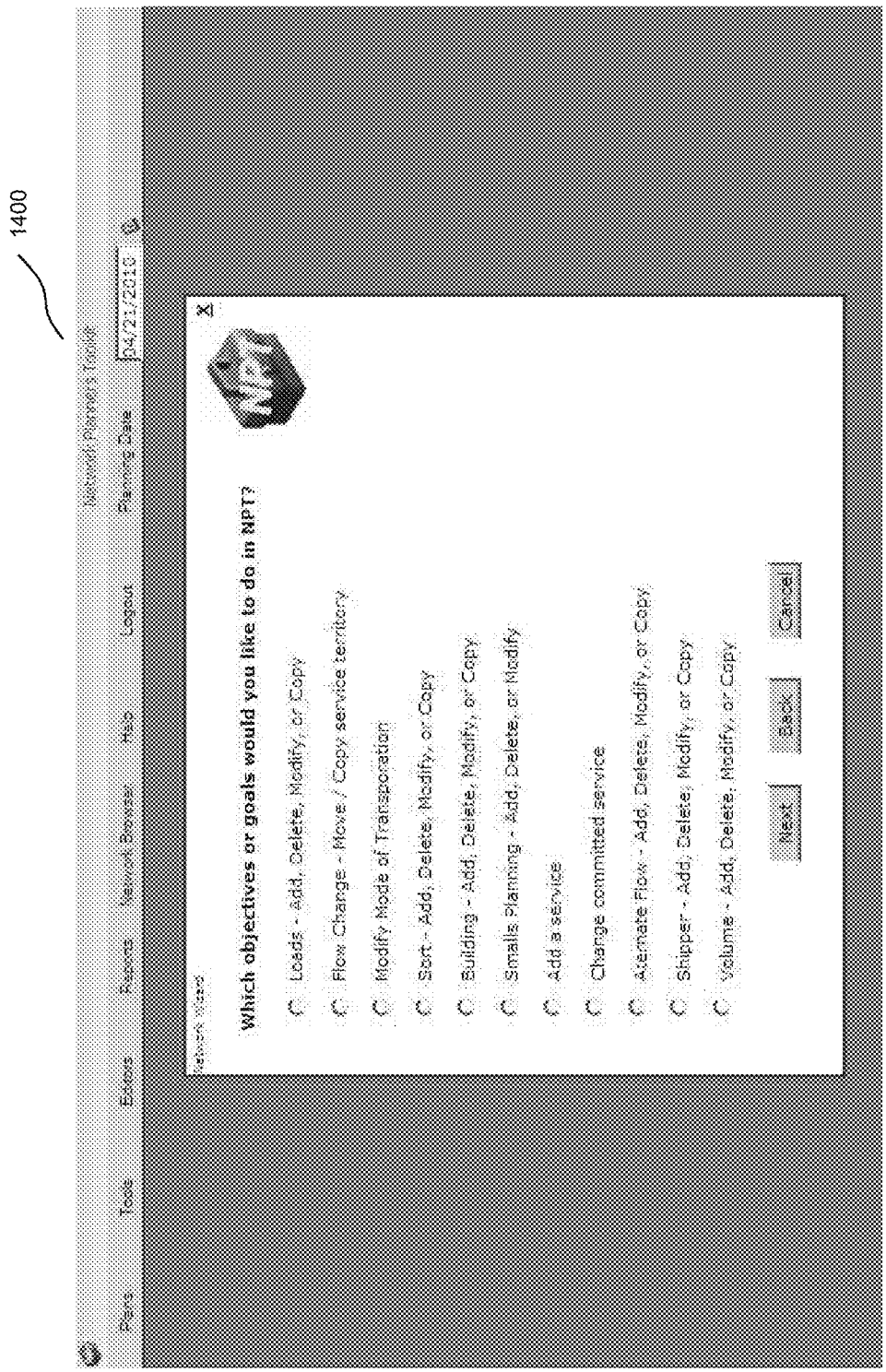
FIG. 14 is an exemplary screen display of an input selection screen 1400 of an operator interface of the network planning tool according to various embodiments.
Figure 15:
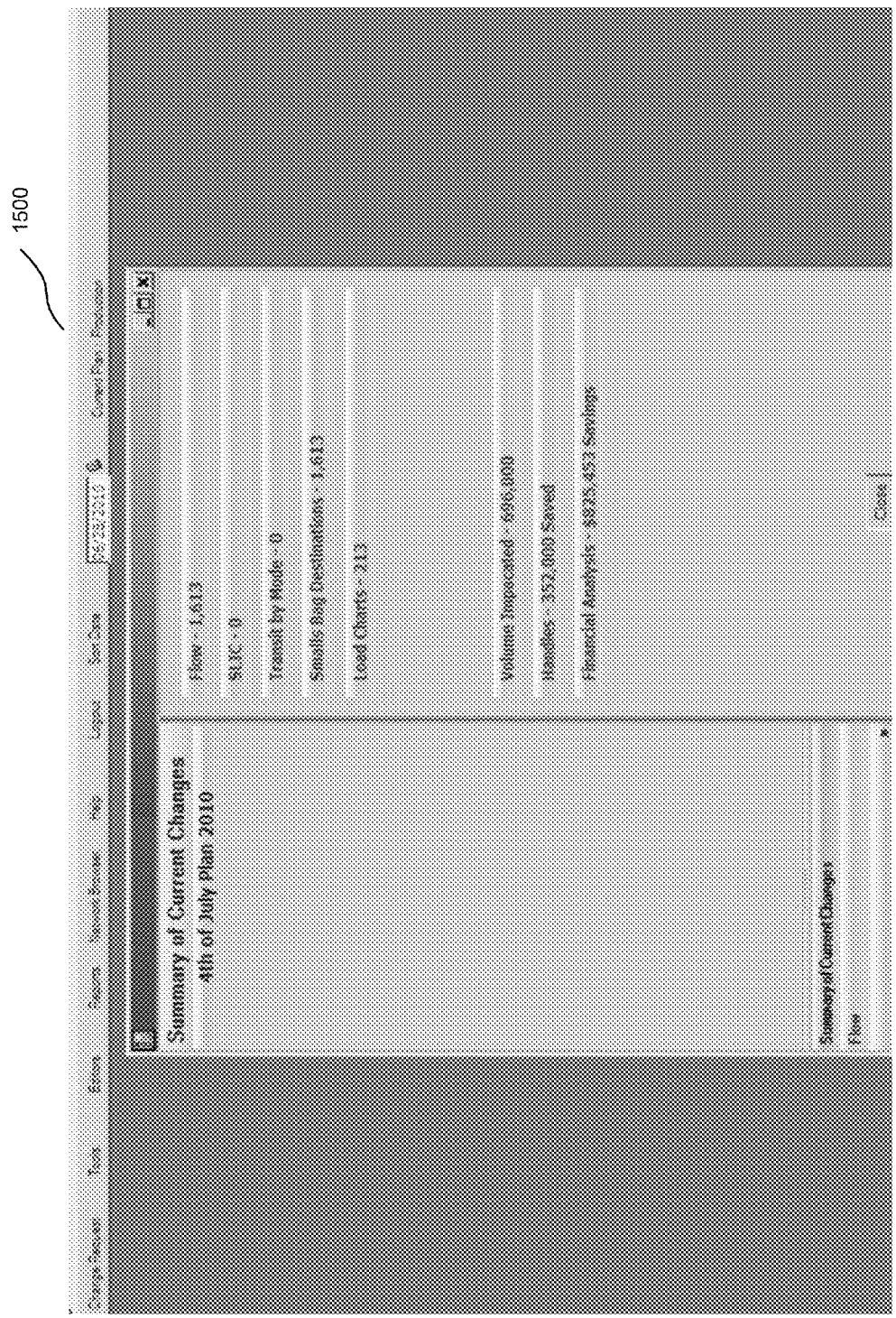
FIG. 15 is an exemplary screen display of a change summary screen 1500 of an operator interface of the network planning tool according to various embodiments.

FIG. 14 illustrates an exemplary screen display 1400 which may be provided as part of various embodiments of the network planning tool 201. In certain embodiments, the screen 1400 may be an optionally selectable wizard or "help" screen, while in other embodiments, the screen 1400 may be configured as a "home" or start screen, wherein users may select one or more objectives or goals they would like to perform and/or achieve within the network planning tool. As non-limiting examples, as illustrated, the user may select to add, delete, modify, or copy one or more loads, change flows of one or more loads, modify or delete a sort requirement, edit characteristics for a particular facility, add or remove a new service level, evaluate alternative flows, and/or modify volume data for various loads, facilities, or otherwise. According to various embodiments, selection of one or more of the options presented on the exemplary screen display 1400 may be referenced by the input module 400 to ascertain whether global or locally focused validation and optimization is most appropriate. In this manner, in these and other embodiments, the network planning tool 201 may be configured to logically determine the nature and scope of optimization, thereby facilitating automatic decision-making within the tool between the alternative global and limited process flows, as previously described herein and illustrated in at least FIGS. 5-10.

FIGS. 15 and 17-20 illustrate a variety of report screens (e.g., 1500, 1700, 1710, 1800, 1900) and/or printable charts (e.g., 2000) that may be generated by the network planning tool 201. In certain embodiments, such may be generated by the distribution module 800, when notifying one or more devices and/or users associated with the tool of optimized model data, while in other embodiments, the exemplary reports and/or charts may be generated by any of the various modules 400, 500, 600, 700, and/or 800, as appropriate and timely, during the course of an input, validation, and optimization process. For example, while the exemplary change summary report 1500 may be generated and displayed to a user during execution of the distribution module 800, it may be additionally and/or alternatively generated and displayed during execution of the validation module, indicating, for example, to the user the load volume and/or the financial impact due to particularly input changes. Likewise, according to various embodiments, cost and load reports 1700, 1710 may be generated and provided to users during the execution of the input module 400 so as to inform user decisions during validation and optimization. The facility impact report screen 1800 and the holiday schedule report screen 1900 may also prove beneficial to generate and provide to users, when changes to facilities and/or volumes committed thereto are being evaluated, validated, and/or optimized.

According to various embodiments, in addition to exemplary screen reports (as previously described) that may be provided for user reference, various charts may be provided for users to view and/or print. As with the reports, such charts, as the exemplary sunrise, preload, and hub load charts 2000 of FIG. 20, may be provided to the users during execution of any of the various modules 400, 500, 600, 700, and/or 800, as may be most appropriate for particular applications. As a non-limiting example, upon receipt of a distribution of newly optimized model data via the distribution module 800, a user may generate and print a set of updated charts, as revised based upon the newly optimized model data. Other embodiments may be otherwise configured, as may be desirable for various applications.

CONCLUSION

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A network planning tool for simulating an integrated flow model for routing a plurality of packages within a plurality of transportation networks, the tool comprising:

one or more memory storage areas containing data related to a plurality of existing loads contained within the plurality of transportation networks, the plurality of existing loads being balanced in a predetermined manner relative to one another; and one or more computer processors configured to:
(A) receive input data comprising one or more modifications to one or more parameters associated with the plurality of transportation networks;
(B) retrieve at least a portion of the data contained in the one or more memory storage areas;
(C) validate the input data against the portion of data retrieved from the one or more memory storage areas, the validating comprising at least calculating one or more impacts to the integrated flow model based at least in part upon the received input data;
(D) determine, based at least in part upon the identified one or more impacts, a plurality of updated flow models for the plurality of transportation networks, said determination of the plurality of updated flow models being based at least in part upon:
where the one or more modifications comprise an addition of a new service level alongside one or more existing service levels, an addition of a new load within the plurality of transportation networks so as to accommodate the new service level received and upon accommodation of the new service level a rebalancing of the new load and the existing loads relative to one another, wherein the new and one or more existing service levels define one or more handling parameters for transport of the plurality of packages; and
where the one or more modifications comprise a deletion of at least one of the one or more existing service levels, a rebalancing of the remaining existing loads relative to one another so as to accommodate the one or more modifications received;
(E) display, on a user interface of a first user device, at least one of the plurality of updated flow models for selection by a user;
(F) receive, via the user interface of the first device, an indication of a user selected updated flow model; and
(G) automatically generate and transmit instructions configured to facilitate implementation of the user selected updated flow model to a plurality of user devices either:
where the one or more modifications comprise the addition of the new service level, the rebalancing of the new load and the existing loads relative to one another; or
where the one or more modifications comprise the deletion of the existing service level, the rebalancing of the existing loads relative to one another so as to accommodate the one or more modifications received.

2. The network planning tool of claim 1, further comprising the step of updating the integrated flow model to reflect a single one of the one or more updated flow models.

3. The network planning tool of claim 2, wherein the one or more computer processors are configured to provide real-time validation and optimization of the integrated flow model for the plurality of transportation networks, based at least in part upon the calculation of the updated flow models for the plurality of transportation networks.

4. The network planning tool of claim 1, wherein the one or more computer processors are configured to automatically perform the recited steps based solely upon receipt of input data in Step A.

5. The network planning tool of claim 4, wherein the one or more computer processors are configured to provide real-time validation and optimization of the integrated flow model for the plurality of transportation networks, based at least in part upon the calculation of the updated flow models for the plurality of transportation networks.

6. The network planning tool of claim 1, wherein:
the input data comprises a global modification to one or more parameters associated with the plurality of transportation networks; and
the portion of retrieved data previously stored comprises an entirety of the previously stored data.

7. The network planning tool of claim 6, wherein:
the global modification comprises a global addition of the new shipping service level within one or more of the plurality of transportation networks; and
the validation step comprises calculating one or more impacts to the integrated flow model based upon the addition of the new shipping service level.

8. The network planning tool of claim 6, wherein:
the global modification comprises a global deletion of the new shipping service level within one or more of the plurality of transportation networks; and
the validation step comprises calculating one or more impacts to the integrated flow model based upon the deletion of the new shipping service level.

9. The network planning tool of claim 8, wherein the calculation of one or more updated flow models comprises calculating at least one flow model wherein one or more commitments associated with the globally deleted service level are rebalanced between one or more remaining service levels so as to optimize the integrated flow model for the plurality of transportation networks.

10. The network planning tool of claim 1, wherein the one or more computer processors are further configured to transmit the one or more updated flow models to one or more distributed devices connected via at least one network.

11. The network planning tool of claim 10, wherein the one or more computer processors are configured to automatically transmit the one or more optimized flow models to the one or more distributed devices, so as to provide real-time updates based upon validation and optimization of the plurality of transportation networks.

12. The network planning tool of claim 1, wherein:
the input data comprises a localized modification to one or more parameters associated with the plurality of transportation networks; and
the portion data retrieved from the one or more storage areas comprises a subset of the entirety of the data contained in the one or more storage areas, the subset comprising data associated with the one or more parameters being modified by the input data.

13. The network planning tool of claim 12, wherein:
the localized modification comprises bypass of a particular load within one or more of the plurality of transportation networks; and
the validation step comprises calculating one or more impacts to the integrated flow model based upon the bypass of the particular load.

14. The network planning tool of claim 12, wherein the localized modification is selected from a group consisting of a bypass of a particular load, a bypass of a particular facility, a bypass of a particular sort, a lane enhancement, a change in service level, and an alternative flow.

15. The network planning tool of claim 12, wherein the one or more computer processors are further configured to automatically transmit the one or more updated flow models to one or more distributed devices connected via at least one network.

16. A computer program product comprising at least one non-transitory computer-readable storage medium having computer-readable program code portions embodied therein, the computer-readable program code portions comprising one or more executable portions configured for:

receiving data associated with a plurality of existing loads contained within the plurality of transportation networks, wherein the data comprises a first portion of existing data and a second portion of newly input data, and wherein the plurality of existing loads being balanced in a predetermined manner relative to one another;

validating the newly input data against the existing data, wherein the validating comprises calculating one or more impacts to an integrated flow model for the plurality of transportation networks based at least in part upon the newly input data;

using the one or more impacts to the integrated flow model, the input data, and the existing data to determine a plurality of updated flow models for the plurality of transportation networks, said determination of the plurality of updated flow models being based at least in part upon:

where the one or more modifications comprise an addition of a new service level alongside one or more existing service levels, an addition of a new load within the plurality of transportation networks so as to accommodate the new service level received and upon accommodation of the new service level a rebalancing of the new load and the existing loads relative to one another, wherein the new and one or more existing service levels define one or more handling parameters for transport of the plurality of packages; and where the one or more modifications comprise a deletion of at least one of the one or more existing service levels, a rebalancing of the remaining existing loads relative to one another so as to accommodate the one or more modifications received;

display, on a user interface of a first user device, at least one of the plurality of updated flow models for selection by a user;

receive, via the user interface of the first device, an indication of a user selected updated flow model; and automatically generating and transmitting instructions configured to facilitate implementation of the user selected updated flow model to a plurality of user devices either:

where the one or more modifications comprise the addition of the new service level, the rebalancing of the new load and the existing loads relative to one another; or where the one or more modifications comprise the deletion of the existing service level, the rebalancing of the existing loads relative to one another so as to accommodate the one or more modifications received.

17. The computer program product of claim 16, further comprising a fourth executable portion configured to transmit at least one of the one or more updated flow models for the plurality of transportation networks to at least one distributed device.

18. The computer program product of claim 16, wherein the second and third executable portions are configured to provide real-time validation and optimization of the integrated flow model for the plurality of transportation networks, based at least in part upon the calculation of the updated flow models for the plurality of transportation networks.

19. A computer-implemented method for facilitating real-time validation and optimization of an integrated flow model for routing a plurality of packages within a plurality of transportation networks, the method comprising the steps of:

(A) receiving and storing input data within one or more memory storage areas, the input data comprising one or more modifications to one or more parameters associated with the plurality of transportation networks;

(B) retrieving from the one or more memory storage areas at least a portion of previously existing data, the previously existing data also being associated with a plurality of existing loads contained within the plurality of transportation networks, the plurality of existing loads being balanced in a predetermined manner relative to one another;

(C) validate, via at least one computer processor, the input data against the retrieved portion of existing data, the validating comprising at least calculating, via the at least one computer processor, one or more impacts to the integrated flow model based at least in part upon the received input data;

(D) determine, via the at least one computer processor, a plurality of updated flow models for the plurality of transportation networks, the one or more updated flow models being based at least in part upon the identified one or more impacts, said determination of the plurality of updated flow models being based at least in part upon:

where the one or more modifications comprise an addition of a new service level alongside one or more existing service levels, an addition of a new load within the plurality of transportation networks so as to accommodate the new service level received and upon accommodation of the new service level a rebalancing of the new load and the existing loads relative to one another, wherein the new and one or more existing service levels define one or more handling parameters for transport of the plurality of packages; and where the one or more modifications comprise a deletion of at least one of the one or more existing service levels, a rebalancing of the remaining existing loads relative to one another so as to accommodate the one or more modifications received;

(E) display, on a user interface of a first user device, at least one of the plurality of updated flow models for selection by a user;

(F) receive, via the user interface of the first device, an indication of a user selected updated flow model; and (G) automatically generate and transmit instructions configured to facilitate implementation of the user selected updated flow model to a plurality of user devices either:

where the one or more modifications comprise the addition of the new service level, the rebalancing of the new load and the existing loads relative to one another; or where the one or more modifications comprise the deletion of the existing service level, the rebalancing of the existing loads relative to one another so as to accommodate the one or more modifications received.

20. The computer-implemented method of claim 19, further comprising the steps of:

updating the integrated flow model to reflect a single one of the one or more updated flow models; and transmit, via the at least one computer processor, the single updated flow model to one or more distributed devices connected via at least one network.

* * * * *